United States Patent
Blangero et al.

(10) Patent No.: US 10,170,763 B2
(45) Date of Patent: Jan. 1, 2019

(54) LITHIUM METAL OXIDE PARTICLES COATED WITH A MIXTURE OF THE ELEMENTS OF THE CORE MATERIAL AND ONE OR MORE METAL OXIDES

(75) Inventors: Maxime Blangero, Cheonan (KR);
Kyubo Kim, Jangan-Gu (KR);
Hyun-Joo Je, Gyeonggi (KR)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 14/125,431

(22) PCT Filed: May 29, 2012

(86) PCT No.: PCT/EP2012/059986
§ 371 (c)(1),
(2), (4) Date: Apr. 3, 2014

(87) PCT Pub. No.: WO2012/171780
PCT Pub. Date: Dec. 20, 2012

(65) Prior Publication Data
US 2014/0212759 A1    Jul. 31, 2014

Related U.S. Application Data

(60) Provisional application No. 61/498,038, filed on Jun. 17, 2011.

(51) Int. Cl.
| | | |
|---|---|---|
| *H01M 4/485* | (2010.01) | |
| *H01M 4/36* | (2006.01) | |
| *H01M 4/525* | (2010.01) | |
| *C01G 51/00* | (2006.01) | |
| *C01D 15/02* | (2006.01) | |
| *H01M 4/50* | (2010.01) | |
| *H01M 4/52* | (2010.01) | |
| *H01M 10/052* | (2010.01) | |
| *H01M 4/02* | (2006.01) | |

(52) U.S. Cl.
CPC ............ *H01M 4/525* (2013.01); *C01D 15/02* (2013.01); *C01G 51/42* (2013.01); *H01M 4/366* (2013.01); *H01M 4/485* (2013.01); *C01P 2002/72* (2013.01); *C01P 2002/86* (2013.01); *C01P 2004/03* (2013.01); *C01P 2004/51* (2013.01); *C01P 2004/80* (2013.01); *C01P 2004/82* (2013.01); *C01P 2006/11* (2013.01); *C01P 2006/40* (2013.01); *C01P 2006/80* (2013.01); *H01M 4/50* (2013.01); *H01M 4/52* (2013.01); *H01M 10/052* (2013.01); *H01M 2004/021* (2013.01)

(58) Field of Classification Search
CPC ....... H01M 4/485; H01M 4/525; H01M 4/386
See application file for complete search history.

(56) References Cited

U.S. PATENT DOCUMENTS

| | | |
|---|---|---|
| 2003/0087155 A1 | 5/2003 | Cho et al. |
| 2003/0180615 A1 | 9/2003 | Johnson |
| 2004/0200998 A1 | 10/2004 | Park |
| 2006/0071198 A1 | 4/2006 | Paulsen |
| 2009/0148772 A1* | 6/2009 | Kawasato et al. ............ 429/223 |
| 2015/0090928 A1 | 4/2015 | Paulsen |

FOREIGN PATENT DOCUMENTS

| | | |
|---|---|---|
| CN | 1565063 A | 1/2005 |
| CN | 101006012 A | 7/2007 |
| CN | 101438436 | 5/2009 |
| EP | 1136446 | 9/2001 |
| JP | 2003-178759 | 6/2003 |
| JP | 2006164758 | 6/2006 |
| JP | 2009530223 | 8/2009 |
| JP | 2011-181527 | 9/2011 |
| WO | 2010/139404 | 12/2010 |

OTHER PUBLICATIONS

JP 2003221234—Translation.*
Hong et al., "Modification of LiCoO2 by Surface Coating with MgO/TiO2/SiO2 for High-Performance Lithium-Ion Battery", Electrochemical and Solid-State Letters, 9 2 A82-A85 2006.*
Julien et al., "Structure, Morphology and Electrochemistry of Doped Lithium Cobalt Oxides", Ionics 6 (2000).*
Chen, Zonghai, et al., "Design of Amorphous Alloy Electrodes for Li-Ion Batteries", Electrochemical and Solid-State Letters, vol. 7, No. 10 (2004), pp. A310-A314.
European Search Report for EP 16 15 4652, dated Jun. 13, 2016.
Caballero, A., et al., "Enhancing the Electrochemical Properties of LT-LiCoO2 in Lithium Cells by Doping with Mn", Journal of Power Sources, vol. 128 (2004), pp. 286-291.
Chinese Office Action for corresponding Chinese Application No. CN 201610112587.4.
Office Action for corresponding U.S. Appl. No. 15/064,669, dated Jan. 19, 2017.
Chen, Z., et al., "Improving the Capacity Retention of LiCoO$_2$ Cycled to 4.5 V by Heat-Treatment", *Electrochemical and Solid-State Letters*, vol. 7, No. 1, (2004), pp. A11-A14.

(Continued)

*Primary Examiner* — Ladan Mohaddes
(74) *Attorney, Agent, or Firm* — NK Patent Law

(57) ABSTRACT

A lithium metal oxide powder for use as a cathode material in a rechargeable battery, consisting of a core material and a surface layer, the core having a layered crystal structure consisting of the elements Li, a metal M and oxygen, wherein the Li content is stoichiometrically controlled, wherein the metal M has the formula $M=Co_{1-a}M'_a$, with $0 \le a \le 0.05$, wherein M' is either one or more metals of the group consisting of Al, Ga and B; and the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr and Si.

19 Claims, 27 Drawing Sheets

(56) References Cited

OTHER PUBLICATIONS

Levasseur, S., et al., "On the Dual Effect of Mg Doping in $LiCoO_2$ and $Li_{1+\sigma}CoO_2$: Structural, Electronic Properties, and $^7Li$ MAS NMR Studies", *Chem. Mater.*, vol. 14 (2002); pp. 3584-3590.
International Search Report dated Sep. 6, 2012 for PCT/EP2012/059986.

* cited by examiner

Figure 1(a) LCO-1
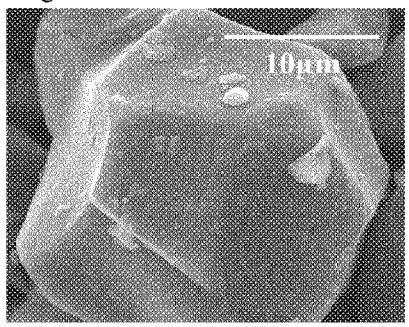
Figure 1(b) Example 1
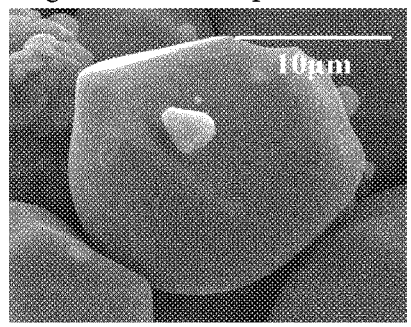
Figure 1(c) Example 2
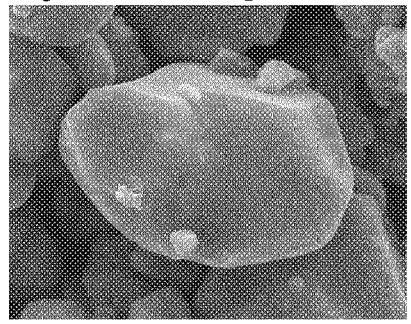
Figure 1(d) LCO-3
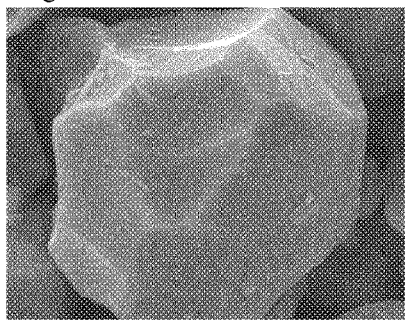
Figure 1(e) Example 3
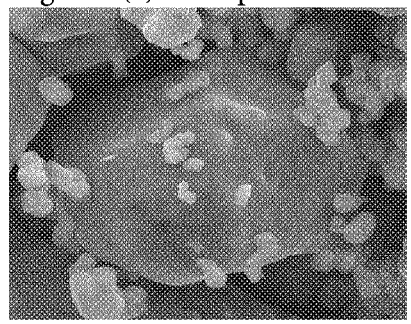

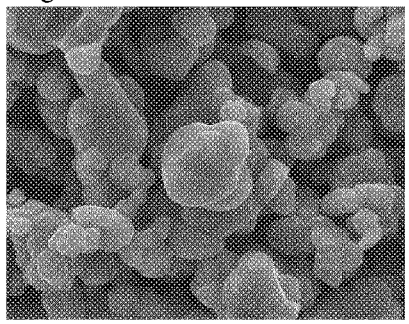
Figure 1(f) LCO-4
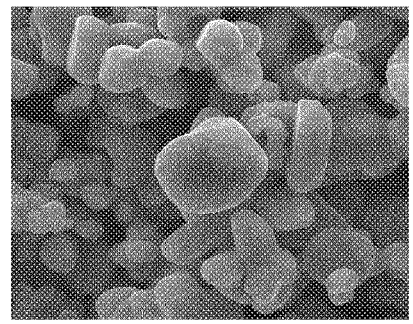
Figure 1(g) Example 4

Figure 9(a) LCO-1
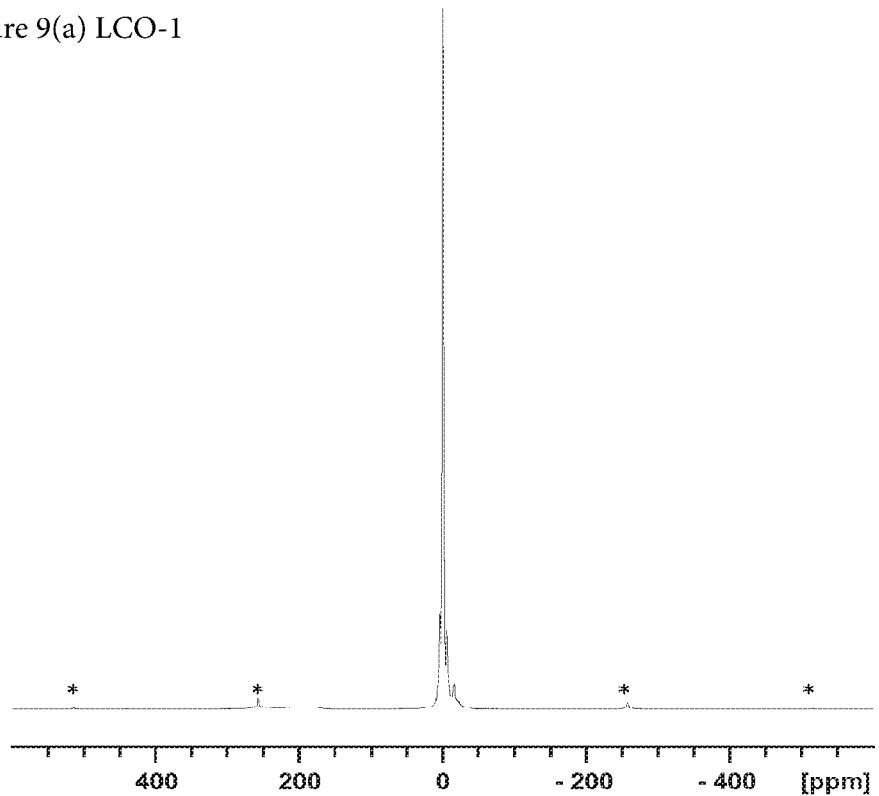
Figure 9(b) LCO-1
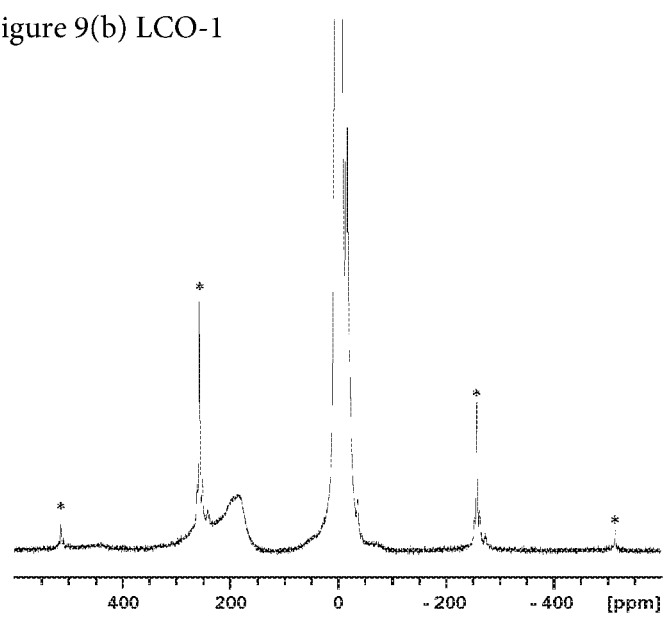

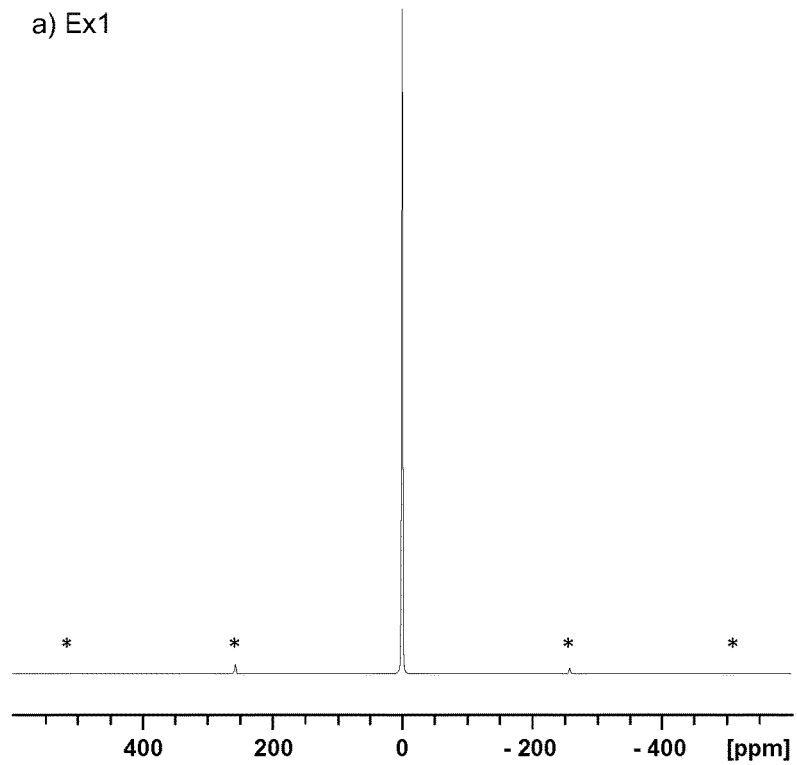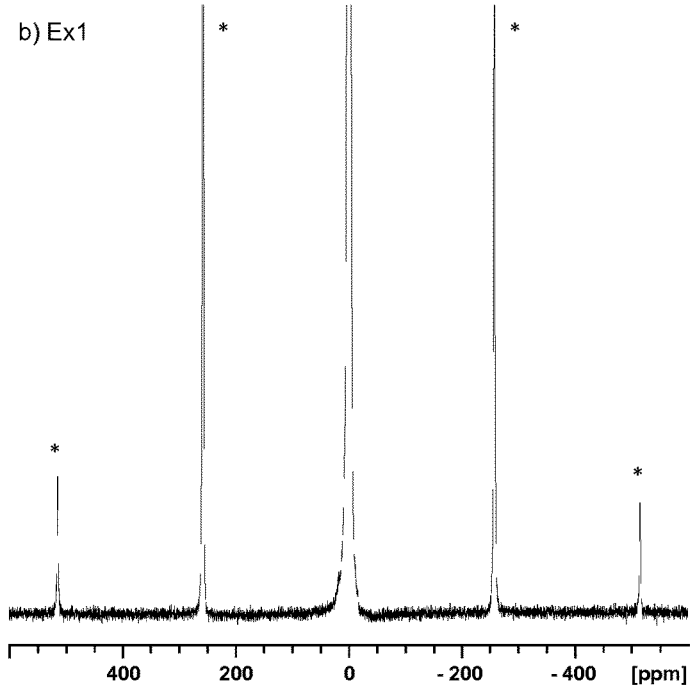
Figure 10

LITHIUM METAL OXIDE PARTICLES COATED WITH A MIXTURE OF THE ELEMENTS OF THE CORE MATERIAL AND ONE OR MORE METAL OXIDES

This application is a National Stage application of International Application No. PCT/EP2012/059986, filed May 29, 2012, which claims the benefit of U.S. Provisional Application No. 61/498,038, filed Jun. 17, 2011.

TECHNICAL FIELD AND BACKGROUND

The invention relates to high voltage stable and high density lithium metal oxide powderous compounds, containing a core having stoichiometrically controlled lithium content and an electron insulating surface. The compounds may comprise known elements such as Mg, Ti and Al for obtaining improved high voltage electrochemical performances and improved energy density. Also a method to manufacture these materials is disclosed. The lithium transition metal oxide powder can be used as a cathode active material in rechargeable lithium batteries.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. As today's consumer electronics demand rechargeable batteries with higher energy density, there is a surge towards $LiCoO_2$-based materials with increased specific capacity for more demanding end applications.

Two common ways to improve the energy density are (a) to increase the charge voltage, typically 4.5V or even 4.6V vs. Li metal when fitted in coin cells, and 4.35V and 4.4V vs. graphite when fitted in full cells, which requires more robust cathode materials which can be charged at higher voltage and (b) to increase the packing density, which requires to increase the particle size of the powder particles. Industrial applicability of these two approaches is however limited by side problems. On one hand, increasing the charge voltage leads to unstable behavior of the electrode, resulting in cathode degradation linked with electrolyte decomposition. As lithium is removed from $Li_xCoO_2$ (x<1), oxidation of $Co^{3+}$ to an unstable oxidation state $Co^{4+}$ follows. The higher the charge voltage, the higher the amount of $Co^{4+}$. Large concentrations of $Co^{4+}$ increase unwanted side reactions between electrolyte and charged cathode. These side reactions result in poor safety, poor cycling stability at elevated voltage and of poor storage properties of charged cathode at elevated temperature. On the other hand, increasing the particle size to increase the packing density impairs power capabilities of rechargeable batteries. In order to meet the power requirements, the battery as a whole and particularly the active cathode material itself must have a sufficient high rate performance. Increasing the mean particle size reduces the solid-state lithium diffusion length which eventually results in lowered rate performance.

Careful studying of published results on cathode materials allows to better understanding the limitations of $LiCoO_2$ based rechargeable lithium batteries. A fundamental limitation of state of the art $LiCoO_2$-based materials development lies in the Li-excess and particle size dilemma. In WO2010-139404, the authors illustrate the relationship between packing density, mean particle size and lithium excess used for the preparation of state of the art Mg and Ti doped $LiCoO_2$. In short, the higher the packing density, the higher the particle size and the higher the Li-excess, expressed as Li:Co>>1.00—typically Li:Co is around 1.05—used for the synthesis. The mechanism is based on a so-called "lithium-flux effect" where the Li-excess acts as a flux enhancing the growth of $LiCoO_2$ particles which eventually increases the packing density. Typical packing densities of ca. 3.70 g/cm³ are achieved for 18 µm particles. Authors also emphasize that large pressed densities are preferable and obtained with monolithic, potato-shaped and non agglomerated primary $LiCoO_2$ particles. Use of larger Li:Co excesses to achieve larger monolithic particles results however in poor electrochemical performances, with lower C-rate and lower discharge capacity, which in return cancels energy density gains achieved by increasing the particle size. Such large Li:Co values also increase pH, free base content and carbon content, which impairs safety, storage and bulging properties of charged cathodes. Levasseur, in Chem. Mater., 2002, 14, 3584-3590 establishes a clear relationship between the increase of structural defect concentrations, as evidenced by means of $^7Li$ MAS NMR, and the increase of Li:Co excess.

As a consequence, current state of the art synthesis does not allow to achieve dense, monolithic $LiCoO_2$-based particles with reduced Li:Co excess. Partial improvements have been achieved but the above basic problems have not yet been fully resolved. Hence there is clearly a need for high capacity $LiCoO_2$ based cathodes which can be cycled in a stable manner in real cells at higher voltages.

In the prior art several approaches have been suggested to cope with this problem. To achieve high voltage stability, $LiCoO_2$ materials are usually coated (for example with $Al_2O_3$) or otherwise chemically modified (e.g. by providing a fluorinated surface). A problem is that coated dense $LiCoO_2$ often has a lower reversible capacity, so that a part of the gain of energy density by charging to higher voltage is annulled by lower intrinsic capacity. This effect can be observed for aluminum oxide protective and LiF protective coatings, but similar effects are observed for other coating approaches such as $ZrO_2$, $AlPO_4$ . . . .

Studying the literature furthermore tells us that coating might not be necessary at all to achieve high voltage stability. Chen& Dahn (Electrochem. Solid-State Lett., Volume 7, Issue 1, pp. A11-A14 (2004)) for example report that a fresh prepared $LiCoO_2$ could cycle in a stable manner at 4.5V if tested in coin cells with Li metal anodes. Such an approach might be correct for coin cells but the effect cannot be reproduced in real commercial cells. These results are confirmed by the fact that now, several years after the publication, special treated—and not pure—$LiCoO_2$ is commercially sold for high voltage applications.

Currently no other strategies are known which lead to high voltage performances. It is an object of the present invention to define a cathode material having a high packing density, high rate performance, improved discharge capacity and showing high stability during extended cycling at high charge voltage for high end secondary battery applications.

SUMMARY

Viewed from a first aspect, the invention can provide a lithium metal oxide powder for use as a cathode material in a rechargeable battery, consisting of a core material consisting of the elements Li, a metal M and oxygen, wherein the Li content is stoichiometrically controlled, wherein the metal M has the formula $M=Co_{1-a}M'_a$, with $0 \leq a \leq 0.05$, preferably $0 \leq a \leq 0.01$, wherein M' is either one or more metals of the group consisting of Al, Ga and B; and a surface layer consisting of a mixture of the elements of the core material and inorganic N oxide particles, wherein N is either one or more metals of the group consisting of Mg, Ti, Fe, Cu, Ca, Ba, Y, Sn, Sb, Na, Zn, Zr and Si. The Li content is stoichiometrically controlled meaning that the ration Li/M=1.00±0.01.

The core has a layered structure—it is known that lithium cobaltite consists of layers of lithium that lie between slabs or layers of octahedra formed by cobalt and oxygen atoms—and may be substantially free from oxygen vacancies and Li substitution for M in the $MO_2$ layers of the layered crystal structure. Also, the core material may be substantially free from paramagnetic metals such as $Co^{2+}$ and intermediate spin $Co^{3+}$ and $Co^{4+}$. All of the metals in M may be diamagnetic and trivalent. The Li in the core may thus occupy a crystallographic site surrounded by trivalent diamagnetic metals. The thickness of the surface layer may be less than 0.008 times the average particle size D50.

In one embodiment, the powder has the general formula $LiCo_{1-a-b}M'_aM''_bO_2$, with $0<a\leq0.05$ and $0\leq b\leq0.02$, M' comprising either one or more elements from the group Al, Mg, Ti, Fe, Cu, Ca, Ba, Y, B, Sn, Sb, Na, Ga, Zn; M'' comprising either one or more elements from the group F, P, S, Zr. The elements F, P and S may be present on the surface under the form of LiF, $Li_3PO_4$ and $Li_2SO_4$. In another embodiment, the concentration of M' and M'' at the surface of the lithium metal oxide powder is at least 5 times the concentration of M' and M'' in the bulk of the powder. In still another embodiment, M' consists of Al, Mg and Ti, the Al content being between 0.1 and 1 mol %, the Mg content being between 0.1 and 1 mol %, and the Ti content between 0.1 and 0.5 mol %. The lithium metal oxide powder of the different embodiments may have a mean particle size D50 of at least 5 µm, preferably at least 8 µm, and more preferably at least 12 µm. In one embodiment the powder has a mean particle size D50 of at least 15 µm.

In one embodiment the powder has a $^7Li$ MAS NMR spectrum characterized by a single Li contribution centered around −0.5 ppm, and wherein the powder has a reversible electrode capacity of at least 200 mAh/g, preferably 210 mAh/g and most preferably 215 mAh/g when used as an active component in a cathode which is cycled between 3.0 and 4.6 V vs. $Li^+/Li$ at a discharge rate of 0.1 C, preferably at 1 C at 25° C. This lithium metal oxide powder may have a 1 C rate capacity fading below 60%, preferably below 40% and most preferably below 30%. The lithium metal oxide powder may also have a 1 C capacity fading inferior to 60%, preferably inferior to 40% and most preferably inferior to 30%.

In another embodiment, the lithium metal oxide powder has a spin lattice relaxation time T1 of at least 500 ms, preferably at least 750 ms and most preferably at least 900 ms. The lithium metal oxide powder of the invention may also have a total base content of less than 50 µmol/g, preferably less than 25 µmol/g, and more preferably less than 15 µmol/g. In one embodiment, the lithium metal oxide powder may have a carbon content less than 50 ppm, preferably <35 ppm, and more preferably ≤25 ppm. In another embodiment, the lithium metal oxide powder may have an electrical conductivity less than $10^{-4}$ S/cm.

The lithium metal oxide powder of the invention may comprise at least 97 mol % of a stoichiometric compound having the general formula $Li\,Co_{1-a}M_a\,O_2$, with $0<a\leq0.05$, preferably $0<a\leq0.01$, and M comprising either one or more elements from the group Al, B and Ga.

In still another embodiment, the lithium metal based powder has a bimodal particle shape distribution with a small and a large particle size fraction, where the small particle size fraction has a D50≤5 µm and represents between 3 to 20 Vol %, and where the large particle size fraction has a D50≥12 µm, preferably D50≥15 µm.

Viewed from a second aspect, the invention can provide a method for manufacturing a lithium metal oxide powder, the metal M having the formula $M=Co_{1-a}M'_a$, with $0\leq a\leq0.05$, preferably $0\leq a\leq0.01$, wherein M' is either one or more metals of the group consisting of Al, Ga and B, comprising the steps of:

providing a first mixture consisting of a first M-comprising and a first Li-comprising precursor powder, the first mixture having a Li to metal molar ratio >1.01, sintering the first mixture in an oxygen comprising atmosphere at a temperature $T_1$ of at least 600° C., thereby obtaining a Li-enriched lithium metal oxide compound, the metal being M;

providing a second M-comprising precursor powder, and mixing the Li-enriched lithium metal oxide compound and the second M-comprising precursor powder, thereby obtaining a second mixture, and sintering the second mixture in an oxygen comprising atmosphere at a temperature $T_2$ of at least 600° C. By "Li-enriched" is meant that the Li content is larger than the stoichiometric quantity in the $LiMO_2$ compound.

In one embodiment, the method for manufacturing a lithium metal oxide powder, the metal M having the formula $M=Co_{1-a}M'_a$, with $0\leq a\leq0.05$, preferably $0\leq a\leq0.01$, wherein M' is either one or more metals of the group consisting of Al, Ga and B, comprises the following steps:

providing a first mixture consisting of a first Co- or Co and M'-comprising, and a first Li-comprising precursor powder, the first mixture having a Li to metal molar ratio >1.01, sintering the first mixture in an oxygen comprising atmosphere at a temperature $T_1$ of at least 600° C., thereby obtaining a Li-enriched lithium metal oxide compound, providing a second Co- or Co and M'-comprising precursor powder, and mixing the Li-enriched lithium metal oxide compound with the second Co- or Co and M'-comprising precursor powder, thereby obtaining a second mixture wherein the molar ratio of Li to metal is 1.00±0.01, and sintering the second mixture in an oxygen comprising atmosphere at a temperature $T_2$ of at least 600° C. In this method, the Li to metal molar ratio of the Li-enriched lithium metal oxide compound is used to determine the quantity of second Co- or Co and M'-comprising precursor powder to be mixed in the second mixture, so as to yield a final Li to metal ratio (in the second mixture) of 1.00±0.01.

In another embodiment, the method for manufacturing a lithium metal oxide powder consisting of a core material and a surface layer, the core material having a layered crystal structure consisting of the elements Li, a metal M and oxygen, wherein the Li content is stoichiometrically controlled, wherein the metal M has the formula $M=Co_{1-a}\,M'_a$, with $0\leq a\leq0.05$, preferably $0\leq a\leq0.01$, wherein M' is either one or more metals of the group consisting of Al, Ga and B; the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr and Si; comprises the steps of:

providing a first mixture of a first Co- or Co and M'-comprising and a first Li-comprising precursor powder, the first mixture having a Li to metal molar ratio >1.01, sintering the first mixture in an oxygen comprising atmosphere at a temperature $T_1$ of at least 600° C., thereby obtaining a Li-enriched lithium metal oxide compound, the metal being M;

providing a second Co- or Co and M'-comprising precursor powder, and mixing the Li-enriched lithium metal oxide compound and the second Co- or Co and M'-comprising precursor powder, thereby obtaining a second mixture wherein the molar ratio of Li to metal is 1.00±0.01, and sintering the second mixture in an oxygen comprising atmosphere at a temperature $T_2$ of at least 600° C.;

wherein either one or more of the first Co- or Co and M'-comprising, the first Li-comprising, and the second Co- or Co and M'-comprising precursor powders further comprises at least one element of the group consisting of Mg, Ti, Fe, Cu, Ca, Ba, Y, Sn, Sb, Na, Zn, Zr and Si. By stating that a Co and M'-comprising precursor further comprises at least one N dopant, there can also be meant that this powder consists of a mixture of compounds, for example $Co_3O_4$ and $Al_2O_3$, and N precursors, such as $TiO_2$ and MgO. In the same way the Li-comprising precursor may be a mixture of for example $Li_2CO_3$ and $TiO_2$ and MgO.

In another embodiment, the step of providing a second Co- or Co and M'-comprising precursor powder comprises the substeps of:

providing a third Co- or Co and M'-comprising precursor powder, providing a second Li-comprising precursor powder, and mixing quantities of the third Co- or Co and M'-comprising precursor powder and the second Li-comprising precursor powder so as to obtain the second Co- or Co and M'-comprising precursor powder having a Li to metal molar ratio of less than 0.9, and preferably less than 0.7. The second Li-comprising precursor powder may be a lithium carbonate powder. The third Co- or Co and M'-comprising precursor powder may be free of lithium.

In the embodiments above, the first and the second Co- or Co and M'-comprising precursor may be the same "M-precursor" compound. When a=0, M=Co, and M' is absent.

In that case, and when a>0 for each Co-comprising precursor powder mentioned above; the first, the second and the third Co-comprising precursor powders may be either one of the group consisting of cobalt oxide, cobalt oxyhydroxide, cobalt hydroxide, cobalt carbonate and cobalt oxalate. In one embodiment, the first, the second and the third Co-comprising precursor powders further comprise at least one element of the group consisting of Ti, Mg, F, Zr and Ca.

In another embodiment, in the methods described before, the ratio of the average particle sizes of the Li-enriched lithium metal oxide and the second Co- or Co and M'-comprising precursor powder is at least 3:1, preferably at least 4:1 and most preferably at least 5:1. The particles of the Li-enriched lithium metal oxide and the second M-comprising precursor powders retain a bimodal particle size distribution upon second firing. In still another embodiment the pressed density of the bimodal particle size powder is at least 0.1 g/cm³ higher than the pressed density of the Li-enriched lithium metal oxide.

Viewed from a third aspect, the invention can provide the use of the lithium metal oxide powder described before as a cathode in an electrochemical cell.

BRIEF DESCRIPTION OF THE DRAWINGS

FIGS. 1(a)-1(g): SEM images at 10000× magnification of both prior art $LiCoO_2$, and material according to the invention.

FIG. 9: $^7$Li MAS NMR spectrum of LCO-1 at a) full scale and b) 50 times expanded intensity scale (116 MHz, spinning 30 kHz, synchronized echo). Lines marked with asterisks (*) indicate spinning sidebands and are artifacts from the measurements.

FIG. 10: $^7$Li MAS NMR spectrum of Ex1 at a) full scale and b) 100 times expanded intensity scale (116 MHz, spinning 30 kHz, synchronized echo). Lines marked with asterisks (*) indicate spinning sidebands and are artifacts from the measurements.

DETAILED DESCRIPTION

Figure 2:
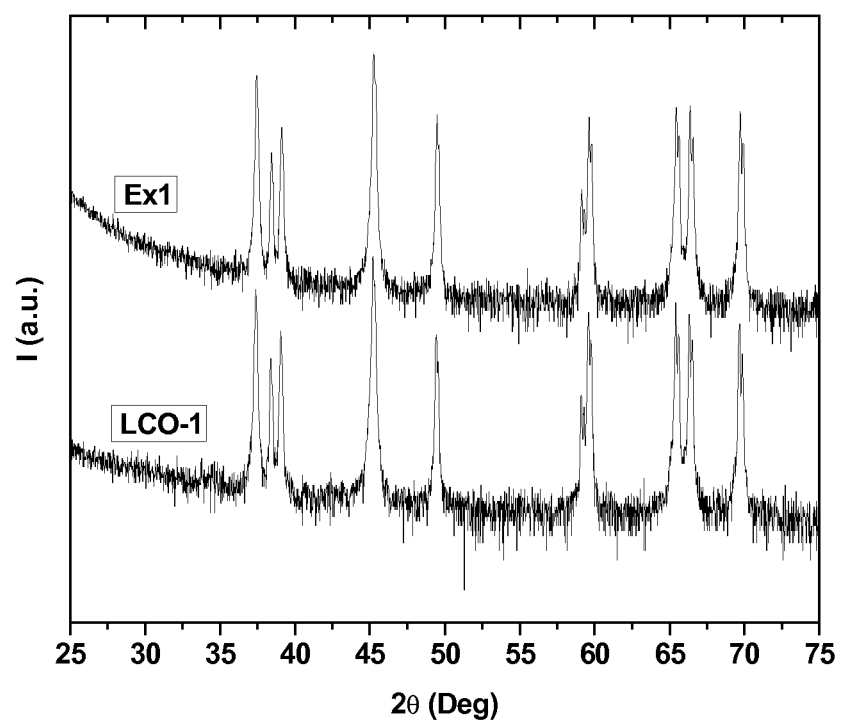
FIG. 2: XRD pattern of LCO-1 and Example 1. Diffracted intensity is plotted in logarithmic scale as function of 2θ in degrees.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention discloses a cathode material having a high packing density, a high rate performance, improved discharge capacity and showing high stability during extended cycling at high charge voltage. This is achieved by a powderous lithium metal oxide consisting of a core material consisting of the elements Li, the metal M and oxygen, wherein the Li content is stoichiometrically controlled; and an electron-insulating surface layer consisting of a mixture of the elements of the core materials or inorganic N-based oxides or combination thereof, wherein N is either one or more metals of the group consisting of Mg, Ti, Fe, Cu, Ca, Ba, Y, Sn, Sb, Na, Zn, Zr and Si.

In one embodiment, the core of the material of the present invention has the formula $Li_{1.00\pm0.01}MO_2$ wherein M has the formula $M=Co_{1-a}M'_a$ with $0\leq a\leq0.05$, wherein M' is either one or more metals of the group consisting of Al, Ga and B and wherein the Li:M molar ratio is stoichiometrically controlled and equal to $1.00\pm0.01$. In another embodiment the core material has hexagonal layered crystal structure described as an ordered rock salt-type crystal structure with space group R-3m. The core may be substantially free from structural defects such as oxygen vacancies and Li substitution for M in the $MO_2$ layers, and also substantially free from paramagnetic metals such as $Co^{2+}$, intermediate spin $Co^{3+}$ and $Co^{4+}$.

The existence of a defect-free core is an inherent feature of the cathode material of the actual invention. The inventors observed that a defect-free core, enabling faster diffusion of Li ions into the particles, is related to the high observed rate performance and improved discharge capacity of the disclosed cathode materials.

The surface layer has an inhomogeneous composition compared to the core with a compositional gradient of the different M, M', Li and O elements. The surface is enriched of elements N such as Mg, Ti, Fe, Cu, Ca, Ba, Y, Sn, Sb, Na, Zn, Zr and Si and, in one embodiment, is formed by segregation from the core and accumulation of these metal dopants at the surface of the particles. In the core, these dopants are substantially absent. Authors could not indisputably establish the chemical nature of the oxides formed at the surface and therefore speculate that, for example in the case of Mg, Si and Ti doping, possible forms, but not limited to, are $LiMO_2$, MgO, CoO, $Co_{1-\varphi}Mg_\varphi O$ with $\varphi\leq1$, $Co_3O_4$, $Mg_\delta Co_{3-\delta}O_4$ with $\delta\leq1$, $TiO_2$, $Li_2TiO_3$, $SiO_2$, $Li_\varepsilon Si_\lambda O_\pi$ with $2\leq\varepsilon\leq8$, $1\leq\lambda\leq2$ and $3\leq\pi\leq7$ . . . These assumptions are supported by the XPS experiments where the chemical shifts observed for Co, Mg and Ti are typical of oxygen environment and the low electrical conductivity of the particles as the above mentioned oxides are expected to be strong insulators. Where it is said that the surface layer consisting of a mixture of the elements of the core material (Li, M, O) and inorganic N-based oxides, by "N-based" oxides are meant also those oxides incorporating Li atoms.

The surface is densely and continuously connected to the core and cannot be physically separated from the particle. Hence in another embodiment the concentration in N metals—with increasing distance from the surface—decreases, possibly in a gradient-like manner and approaches zero in the inside of the particles. The N-enriched surface of the particles feature two additional and unexpected properties:
  (i) The surface is substantially free from lithium salts such as LiOH and $Li_2CO_3$. Such characteristic is particularly desirable in high density high voltage applications such as high-end polymer or prismatic cells as bulging and storage properties are considerably improved.
  (ii) Surprisingly, the N-enriched surface particles are also featuring electron-insulating properties. Authors speculate that the accumulation of oxidized N-based species are responsible for the low electronic conductivity and provide a physical separation from the electrolyte, further preventing undesirable side-reactions.

The surface layer is typically between 20 nm to 200 nm, and preferably between 20 nm and 100 nm thick, and is primarily affected by two parameters:
(i) the N content: the thickness increases when the N-content increases.
(ii) the particle size distribution of the powder materials. The lower the particle size for a given amount of N, the thinner the surface layer. A too thick layer is not desirable as it results in increased polarization and eventually in lower rate performance. Conversely, a too thin layer is also not advantageous as it will provide bad shielding against electrolyte and be less efficient in preventing parasitic-reactions.

As initially said, an essential feature of $LiCoO_2$-based cathode materials is a high packing density, which allows increasing the energy density of commercial secondary batteries. In the present invention, a preferred morphology embodiment to achieve high packing density consists in monolithic, potato-shaped and non-agglomerated particles. A monolithic particle does not exhibit inner porosity, and it does not consist of agglomerates of smaller primary particles. A typical particle size (D50) is a least 5 µm or even at least 10 µm, and preferably above 15 µm. The pressed density is typically in the range of over 3.40 g/cm³ and preferably at least 3.70 g/cm³. In one embodiment, the pressed density is as high as 3.90 g/cm³. In another embodiment the pressed density is at least 3.40 g/cm³ for a powder with an average particle size above 6 µm. In still another embodiment the pressed density is at least 3.75 g/cm³ for a powder with an average particle size above 15 µm.

In a process embodiment, a process for manufacturing the high-density and high stability compounds of the present invention runs as follows:
(i) providing a first mixture of a first metal M-comprising and a first Li-comprising precursor powder, the first mixture having a Li to metal molar ratio >1.01,
(ii) sintering this mixture in an oxygen comprising atmosphere at a temperature $T_1$ of at least 600° C., thereby obtaining a Li-enriched lithium metal oxide compound;
(iii) providing a second M-comprising precursor powder,
(iv) mixing the Li-enriched lithium metal oxide compound and the second M-comprising precursor powder into a second mixture, whereby the molar ratio of Li:M in the mixture is adjusted to $1.00\pm0.01$, and
(v) sintering the second mixture in an oxygen comprising atmosphere at a temperature $T_2$ of at least 600° C. In one particular embodiment, the metal M=Co.

Later in the text, steps (i) and (ii) are further referred as "the first firing" and steps (iii), (iv) and (v) as the "second firing". Different implementations of the actual invention are possible, especially regarding the process conditions, the nature of the different precursors and their sequence of blending.

The first M-comprising precursor and second M-comprising precursor can be a mixture of cobalt containing precursor and M' containing precursor. Examples of suitable cobalt containing precursors include cobalt oxide, hydroxide, oxyhydroxide, carbonate and oxalate. The M' containing precursor can be an oxide, hydroxide or organic complex, preferably having sub-micrometric powderous morphology in order to achieve homogeneous distribution and easy blending process.

In several embodiments, either one or both of the first M-, the second M- and the first Li-comprising precursor powders further comprise at least one dopant (M' or N) from the group consisting of Al, Mg, Fe, Cu, Ti, Ca, Ba, Y, B, Sn, Sb, Na, Ga, Zn, F, P, S, and Zr. In one of these embodiments, either one or both of the first M- and the first Li-comprising precursor powders further comprise at least one element of the group consisting of Mg, Fe, Cu, Ti, Ca, Ba, Y, Sn, Sb, Na, Zn, Zr, F, P, S and Si. A homogeneous distribution of N dopant elements is of primary importance and can be improved by using this process embodiment. In an alternative process embodiment, the homogeneous dispersion of N dopants is improved when the second M-comprising precursor powder further comprises at least one element of the N dopant element group consisting of Mg, Fe, Cu, Ti, Ca, Ba, Y, Sn, Sb, Na, Zn, Zr and Si. Examples of suitable compounds comprising N elements are oxides (such as MgO, $TiO_2$, $SiO_2$, . . . ), fluorites (such as $MgF_2$ . . . ) with sub-micrometric particle size.

In one particular embodiment, Ti and Mg, preferably in the form of $TiO_2$ and MgO particles with a D50 of respectively less than 100 nm, and less than 1 µm, are added to either one or both of the first and second mixtures described above. In another embodiment, Al, preferably in the form of $Al_2O_3$ particles with a D50 of less than 100 nm is added to the second mixture described above. In another particular embodiment the Li-enriched lithium metal oxide compound is $LiCoO_2$ with dense monolithic particles of at least 5 and preferably at least 10 to 20 micrometers. Many commercial prior art $LiCoO_2$ materials already have this desired morphology.

In yet another particular embodiment the second M comprising precursor features a particle size distribution with a D50 of less than ⅓, preferably less than ¼ of the D50 of the Li-enriched lithium metal oxide compound. In one embodiment, the size ratio between the second M comprising precursor and the Li-enriched lithium metal oxide compound is ⅙. In the latter case and after the second firing, a bimodal distribution is obtained wherein the $LiMO_2$-based particles originating from the second M comprising precursor are small enough to (a) support a very high C rate and (b) fit nicely in the voids of the larger lithium metal oxide particles packing, which allows for low porosity electrodes and a high volumetric energy density.

The Li-enriched lithium metal oxide compound, referred as the state of the art compound, obtained after the first sintering step, is further characterized by:
an NMR signal containing at least 2 contributions,
large amounts of lithium salts and carbon at the surface of the particles,
an electric conductivity higher than $10^{-4}$ S/cm$^2$,
poor electrochemical performances, namely low C-rate and low discharge capacity.

On the contrary, by finely controlling the lithium stoichiometry, the cathode materials of the present invention, obtained after the second sintering step, are characterized by:
a unique NMR contribution centered around 0 ppm,
extremely low amounts of lithium salts and carbon at the surface of the particles,
an electric conductivity lower than $10^{-5}$ S/cm,
improved electrochemical performances, namely high C-rate and high discharge capacity.

The Li content of the materials of the present invention is stoichiometrically controlled meaning that the Li:M molar ratio is in the range of 1.00±0.01. Authors have observed that if the targeted Li:M is above 1.01, then the electrochemical performances, such as lower discharge capacity and lower high voltage stability, and physical properties such as an increase of base content and carbon content, of the resulting material are inferior. Likewise, if the targeted Li:M is below 0.99, then the materials, though retaining very good high voltage stability, undergo two undesirable effects:
(i) less active materials is available and the discharge capacity is lowered, and, (ii) a surface enriched in cobalt-based spinel is formed at the surface of particles, which increases the cell polarization.

The inventors have made two surprising observations, which are believed to be essential aspects of the invention:

First observation: The core of the particles is lithium stoichiometric and substantially free from defects. The lithium metal oxide according to the present invention shows electrochemical properties different from those of lithium metal oxides, which are prepared according to state of the art methods, and which contain the same components as the lithium metal oxide of the present invention. This change in physical properties can be observed by $^7$Li-NMR. In $^7$Li-NMR, when a strong magnetic field is externally applied to a lithium-containing material, Li chemical shift values will be shifted due to various hyperfine interactions between a lithium nucleus having a nuclear magnetic moment and the unpaired electrons of metal components contained in the lithium-containing material. The local structural and electronic characteristics of a specific component in the crystal structure of the lithium-containing material can be assessed by measuring the different contributions to the $^7$Li NMR spectrum caused by such chemical shift values.

In a state of the art Ti and Mg-doped lithium cobalt oxide (in the Examples below the materials LCO-1, LCO-3 and LCO-4), prepared according to a conventional method, a sharp peak at around −0.5 ppm in $^7$Li NMR spectra, and additional peaks having their center of mass at around 185 ppm, 5 ppm, −7 ppm, −16 ppm and −40 ppm, are observed (see FIG. 9). In this case, the sharp Li resonance at around −0.5 ppm indicates a Li crystallographic site coordinated only to diamagnetic $Co^{3+}$ metals ($t_{2g}^6 e_g^0$); the electrons of which are all paired. The extra peaks centered at around 185 ppm, 5 ppm, −7 ppm, −16 ppm and −40 ppm indicate Li crystallographic sites partially or fully coordinated to paramagnetic intermediate-spin $Co^{3+}$ ($t_{2g}^5 e_g^1$) in addition to the diamagnetic low-spin $Co^{3+}$ metals ($t_{2g}^6 e_g^0$) as discussed in Levasseur, Chem. Mater., 2002, 14, 3584-3590. The interactions between the unpaired electrons of paramagnetic metals and lithium nuclei results in various chemical shifts and allow to reveal different and multiple Li site environments for LCO-1, LCO-3 and LCO-4. The authors speculate that the presence of dopants N, such as Mg and Ti, in the core of the $LiMO_2$ particle (as was established in the literature by other techniques such as X-ray diffraction by Wenbin Luo et al., J. Electrochem. Soc., 2010, 157, 782) will change the spin state and valency of cobalt ions (as it is expected for $Mg^{2+}$ or $Ti^{4+}$ substitution for low spin $Co^{3+}$) or introduce other electron spin carriers (such as $Ti^{3+}$) further increasing the concentration of structural and paramagnetic defects in the core.

In comparison with this, it can be seen that the lithium metal oxide of the present invention shows a unique Li peak around −0.5 ppm though having the same components and composition as those of a lithium metal oxide prepared according to a state of the art method. Consequently, Ex1, Ext, Ex3, Ex4 and Ex5 (see below) contain only one Li site environment solely surrounded by diamagnetic trivalent metal ions such as $Co^{3+}$ ($t_{2g}^6 e_g^0$) or $Al^{3+}$ ($2p^6$). The core of the Example materials is therefore substantially free from paramagnetic impurities, structural defects and dopants N such as $Mg^{2+}$, $Ti^{3+}$ or $Ti^{4'}$.

This observation is further confirmed by the measurement of the T1 spin-lattice relaxation time which clearly evidences that paramagnetic spin concentration is larger in the state of the art LiCoO$_2$-based materials when compared to the cathode materials of the present invention.

Second observation: When dopants N are present, the surface is formed during the second sintering by spontaneous segregation of the dopants from the core. The exact mechanism of this "in-situ" coating is unknown but authors assume that it is privileged when the lithium stoichiometry is finely controlled and Li:M molar ratio equal to 1.00±0.01. In this case a cooperative reaction occurs where the core of the particle becomes lithium stoichiometric and N dopants such as Mg and Ti are expelled and accumulated at the surface of the particles. As mentioned above, this is corroborated by NMR observations.

Linked to this, another important feature of the cathode materials of the present invention are their "insulating" nature. These cathode materials have conductivities which are at least 2-3 orders lower than those of the least conductive currently known cathode material. For example, commercial LiCoO$_2$ has a relatively high electrical conductivity in the range of $10^{-2}$ to $10^{-3}$ S/cm. That such insulating cathodes can yield excellent electrochemical performance, namely a large discharge capacity and C-rate performance, is a surprise because it is commonly accepted that high electrical conductivity is needed for the Li$^+$ cation diffusion within the solid cathode and across the interface between electrolyte and cathode.

It is believed that the low conductivity provided by the surface layer is the main reason for the high voltage stability of the cathode materials of the present invention.

When a LiCoO$_2$-based cathode is charged to high voltage—meaning the cathode is strongly de-intercalated—we achieve a Li$_x$CoO$_2$ (x<<1) composition where most of the cobalt ions are in the 4+ valence state. Tetravalent-cobalt containing Li$_x$CoO$_2$ is a very strong oxidizer and is highly reactive. The electrolyte becomes thermodynamically unstable when in contact with such an oxidizing surface. A reaction with the electrolyte (being the reducing agent) is strongly preferred energetically. Even at low temperature—during normal cycling of a LiCoO$_2$ cathode at high voltage—this reaction proceeds slowly but continuously. Reaction products cover the cathode surface and the electrolyte is decomposed, and both effects continuously cause a deterioration of the electrochemical performance of the battery. Also, a loss of capacity and a strong increase of resistance—by polarization—is observed.

Obviously, a cathode material protected by an insulating surface layer will solve this problem by physically separating tetravalent cobalt ions from the electrolyte and eventually preventing further electrolyte reduction. By careful selection of the compounds, such as Mg, Zr, Si and Ti, the process allows to achieve an in-situ coating of the final powder with a layer that is enriched in oxidized compounds, like MgO and TiO$_2$, that may also be lithiated. This inert coating layer provides additional safety when the powders are in contact with the electrolyte of the battery.

Measurement Techniques Used in the Examples:

Measurement of the electrical conductivity is performed under an applied pressure of 63.7 MPa in the 4-probe configuration. In the description and claims the value of 63 MPa is also mentioned as round-off, when the actual pressure of 63.7 MPa is applied.

Electrochemical performances are tested in CR2032 coin type cells, with a Li foil as counter electrode in a lithium hexafluorite (LiPF$_6$) type electrolyte at 25° C. The active material loading is 10.5 (±0.5) mg/cm$^2$. Cells are charged to 4.3V and discharged to 3.0V to measure rate performance and capacity. The high voltage discharge capacity and capacity retentions during extended cycling are measured at 4.5V and 4.6V charge voltages. A specific capacity of 160 mAh/g is chosen for the determination of the discharge rates. For example, for the discharge at 2 C, a specific current of 320 mA/g is used. The following table is a description of the test that is used for all of the coin cells in this description:

| Cycle number | Charge condition | Discharge condition | Test description |
|---|---|---|---|
| 1 | 4.3 V cutoff at 0.1 C | 3.0 V cutoff at 0.1 C | Voltage profile |
| 2 to 6 | 4.3 V cutoff at 0.25 C | 3.0 V cutoff at 0.2, 0.5, 1, 2 and 3 C | Rate performance |
| 7 and 31 | 4.5 V (or 4.6 V*) cutoff at 0.25 C | 3.0 V cutoff at 0.1 C | Slow reference cycle before and after stability. Cycle 7 (31) gives the discharge capacity 0.1 C at 4.5 V (or 4.6 V*). |
| 8 and 32 | 4.5 V (or 4.6 V*) cutoff at 0.25 C | 3.0 V cutoff at 1 C | Fast reference cycle before and after stability. Cycle 8 (32) gives the discharge capacity 1 C at 4.5 V (or 4.6 V*) |
| 9 to 30 | 4.5 V (or 4.6 V*) cutoff at 0.25 C | 3.0 V cutoff at 0.5 C | Stability test at high voltage |

*as specified in the Examples

The following definitions are used for data analysis: Q: capacity, D: Discharge, C: Charge, followed by a number to indicate cycle number. For example, the slow high voltage discharge capacity DQ7 is measured during the 7$^{th}$ cycle in the 4.5 (or 4.6)—3.0V range at 0.1 C. The fast high voltage discharge capacity DQ8 is measured during the 8$^{th}$ cycle in the 4.5 (or 4.6)—3.0V range at 1 C.

Irreversible capacity Qirr (%) is ((CQ1−DQ1)/CQ1)×100.

Rate performance is defined by the ratio of DQ at respectively 0.2, 0.5, 1, 2 and 3 C versus DQ at 0.1 C, converted to and expressed in %.

Capacity fade rate—expressed in %—at 0.1 C per 100 cycles is calculated as follows: (1−(DQ31/DQ7))×100/23. Likewise, capacity fade rate at 1 C per 100 cycles is: (1−(DQ32/DQ8))×100/23.

Energy fade rates at 0.1 C and 1 C are calculated in a similar way than capacity fade rate but instead of the discharge capacity DQ the discharge energy (defined as DQ×average discharge voltage) is used in the calculation.

$^7$Li magic angle spinning (MAS) NMR spectra is recorded on a Bruker 300 Avance spectrometer at 116 MHz (7.05 T magnet), with a standard 2.5 mm Bruker MAS probe. A combination of single-pulse and Hahn echo sequences is used in MAS conditions (30 kHz spinning speed). The single-pulse sequence with $t_{\pi/2}$=2.0 μs requires a first-order phasing process with a sin(x)/x baseline correction due to the dead time of the spectrometer. The rotor-synchronized Hahn echo sequence $[t_{\pi/2}-\tau_1-t_\pi-\tau_2]$ (with $\tau_1=\tau_2$ being equal to one rotor period, i.e. 33.33 microseconds) is used to facilitate the phasing of all the signals and to ensure the observation of possible very wide signals which are lost during the receiver dead time, while refocusing the interactions with electron spins. The 90° pulse duration is equal to $t_{\pi/2}$=2.0 μs. A recycle time of 100 s is used. The isotropic chemical shifts, expressed in ppm, have been obtained using 1M LiCl dissolved in H$_2$O as external reference.

T1 spin-lattice relaxation times are measured using the inversion-recovery sequence on static samples. The T1 is determined by single exponential fitting of the magnetization recovery intensity as function of the recovery delay (from 100 μs to 100 s).

X-ray photoelectron spectroscopy (XPS) measurements are carried out using a Kratos Axis Ultra spectrometer fitted with a focused monochromatized Al Kα radiation (hυ=1486.6 eV). For the Ag $3d_{5/2}$ line, the full width at half-maximum is 0.58 eV under the recording conditions. The analyzed area of the sample is 300×700 μm². Peaks are recorded using a constant pass energy of 20 eV. The pressure in the analysis chamber is ca. $5\times10^{-7}$ Pa. To prevent the sample from moisture and air exposure, sampling is performed in an argon dry box which is directly connected, through a transfer chamber, to the XPS spectrometer. Short acquisition time control spectra are recorded at the beginning and at the end of each experiment to confirm the non-degradation of the samples. The binding energy scale is calibrated from $LiCoO_2$ peaks (Co2p, Co3p and O1s). Core peaks are analyzed using a non-linear Shirley-type background. The peak positions and areas are optimized by a weighted least-square fitting method using 70% Gaussian and 30% Lorentzian line shapes. Quantification was performed on the basis of Scofield's relative sensitivity factors. For depth profiling experiments, the depth has been calculated relatively to a sample of $Ta_2O_5$ for which an argon etching speed of 0.32 nm/s has been observed.

The base content is a material surface property that can be quantitatively measured by the analysis of reaction products between the surface and water. If powder is immersed into water a surface reaction occurs. During the reaction the pH of the water increases ("base dissolves") so the base is quantified by a pH titration. The result of the titration is the "soluble base content" (SBC). The content of soluble base can be measured as follows: 100 ml of de-ionized water is added to 7.5 g of cathode, followed by stirring for 8 minutes. Settling-down is allowed for typically 3 minutes, then the solution is removed and passed through a 1 μm syringe filter, thereby achieving >90 g of a clear solution which contains the soluble base. The content of soluble base is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau is $OH^-/H_2O$ followed by $CO_3^{2-}/HCO_3^-$, the lower plateau is $HCO_3^-/H_2CO_3$. The inflection point between the first and second plateau as well as the inflection point after the second plateau is obtained from the corresponding minima of the derivative dpH/dVol of the pH profile. The second inflection point generally is near to pH 4.7. Results are listed as micromole of base per g of cathode.

The amount of base which goes into solution is very reproducible, and is directly related to surface properties of the cathode. Since these have a significant influence on the stability (i.e. safety and overcharge/high T storage properties of the final battery) there is a correlation between base content and stability. The soluble base content is discussed more in detail in co-pending application EP11000945.3.

Examples 1-4

Preparation of Li:Co Stoichiometrically-Controlled Lithium Cobalt Based Oxides

These examples demonstrate that Li:Co stoichiometrically-controlled doped lithium cobalt based oxides featuring a $^7Li$ MAS NMR spectrum characterized by a single Li contribution centered around −0.5 ppm and an increased T1 spin-lattice relaxation time is also characterized by a high voltage cycling stability. The improved stability, single contribution $^7Li$ MAS NMR spectrum and longer T1 are obtained by optimizing lithium to metal ratio.

Example 1

The characterization of Examples 1 and 2 will demonstrate that Li-stoichiometry controlled $LiCoO_2$-based cathode materials, i.e. having a Li/Co ratio of 1.00±0.01, comprising a core where Li atoms occupy a single site surrounded by trivalent diamagnetic metals, and having an electron insulating surface comprising the elements of the core material (Li, Co) and inorganic metal oxides comprising Mg and Ti show improved features for high voltage applications.

Preparation of LCO-1: 0.25 mol % titanium and 0.5 mol % magnesium doped $Co(OH)_2$ as precursor for $LiCoO_2$ is prepared in a pilot line according to the process explained in WO2010-139404. A state of the art titanium and magnesium doped $LiCoO_2$ (noted LCO-1) is obtained by means of a standard high temperature solid state synthesis (=the first firing step) by mixing the precursor with $Li_2CO_3$. Typical Li:Co molar ratio used in the $Li_2CO_3$-doped $Co(OH)_2$ blend is 1.06 to 1.12. The average particle size of LCO-1 is 20 μm. The final Li:Co mol ratio of LCO-1 after firing measured by ICP is 1.053 and will be used to determine Li:Co ratio for examples 1 and 2. LCO-1 is also referred to as the lithium doped cobalt oxide "parent" of Example 1 and Example 2.

Preparation of Example 1 (noted Ex1): 95 mol % of LCO-1 and 5 mol % of 0.25 mol % Ti and 0.5 mol % Mg doped $Co(OH)_2$; corresponding to respectively 95.24 wt. % and 4.76 wt. %; are mixed in order to target a final Li:Co mol ratio of 1.000. The mass of reagents has been calculated assuming a cobalt weight content in LCO-1 and $Co(OH)_2$ of respectively 60.21 wt. % and 63.40 wt. %, resulting in an absolute error of less than 0.2% in the calculation of Li:Co. The homogeneous mixture is placed in an alumina crucible and heated (=the second firing step) at 925° C. for 12 hours under constant air flow. After cooling, the resulting powder (Ex1) is sieved and characterized. The average particle size of Ex1 is found to be 20 μm.

Example 2

Preparation of Example 2 (noted Ex2): 94 mol % of LCO-1 and 6 mol % of 0.25 mol % Ti and 0.5 mol % Mg doped $Co(OH)_2$; corresponding to respectively 94.28 wt. % and 5.72 wt. %; are mixed in order to target a final Li:Co mol ratio of 0.990±0.002. The homogeneous mixture is placed in an alumina crucible and heated at 925° C. for 12 hours under constant air flow. After cooling, the resulting powder (Ex2) is sieved and characterized. The average particle size of Ex2 is found to be 20 μm.

Example 3

The characterization of Example 3 will demonstrate that Li-stoichiometry controlled $LiCoO_2$-based cathode materials, comprising a core where Li atoms occupy a single site surrounded by trivalent diamagnetic metals, where Co is partly substituted by $Al^{3+}$, and having an electron insulating surface comprising the elements of the core material (Li, Co and Al) and inorganic metal oxides comprising Mg and Ti, show improved high voltage features and large pressed densities.

Preparation of LCO-3: state of the art titanium and magnesium doped LiCoO$_2$ (noted LCO-3) is obtained by means of a standard high temperature solid state synthesis by dry-mixing powders of Co$_3$O$_4$ with TiO$_2$, MgO and Li$_2$CO$_3$. LCO-3 contains 0.25 mol % titanium and 0.25 mol % magnesium. Typical Li:Co molar ratio used for the blend is 1.10. The average particle size of LCO-3 is 18 μm. The final Li:Co mol ratio of LCO-3 after firing—as measured by ICP—is 1.070, and is used to set the Li:(Co+Al) ratio for Example 3.

Preparation of Example 3 (noted Ex3): A cathode powder material is prepared by mixing 85.40 wt. % of LCO-3, 10.51 wt. % Co$_3$O$_4$ with mean particle size of 3 μm, 3.47 wt % Li$_2$CO$_3$, 0.05 wt % of MgO, 0.05 wt % of TiO$_2$ and 0.52 wt % Al$_2$O$_3$, so as to adjust the Al:Co mol ratio to 0.01:0.99 (or 1 mol % Al substitution on Co sites) and the final Li:(Co+Al) molar ratio to 1.000±0.002. The homogeneous mixture is placed in an alumina crucible and heated at 980° C. for 12 hours under constant air flow. After cooling, the resulting powder (Ex3) is sieved and characterized. The average particle size of Ex3 is found to be 16 μm, and a bimodal distribution is obtained.

Example 4

The characterization of Example 4 will demonstrate that LiCoO$_2$-based cathode materials comprising a core with Li stoichiometry control, where Li occupy a single site surrounded by trivalent diamagnetic metals, and having an electron insulating surface comprising the elements of the core material (Li, Co) and inorganic metal oxides comprising Mg and Ti, are suitable for high power applications where maintaining high C-rate and high average voltage are required.

Preparation of LCO-4: state of the art titanium and magnesium doped LiCoO$_2$ (noted LCO-4) is obtained by means of a standard high temperature solid state synthesis by dry-mixing powders of Co$_3$O$_4$ with TiO2, MgO and Li$_2$CO$_3$. LCO-4 contains 0.18 mol % titanium and 0.40 mol % magnesium. Typical Li:Co molar ratio used for the blend is 1.03. The average particle size of LCO-4 is 6 μm. The final Li:Co mol ratio of LCO-4 after firing—as measured by ICP—is 1.015, and is used to set the Li:Co ratio for Example 4.

Preparation of Example 4 (noted Ex4): 98.5 mol % of LCO-4 and 1.5 mol % of Ti (0.18 mol %) and Mg (0.4 mol %) doped Co$_3$O$_4$; corresponding to respectively 98.77 wt. % and 1.23 wt. %; are mixed homogeneously in order to target a final Li:Co mol ratio of 1.000±0.002. The mass of reagents has been calculated assuming a cobalt weight content in LCO-3 and Co$_3$O$_4$ of respectively 60.21 wt. % and 73.42 wt. %.

The mixture is placed in an alumina crucible and heated at 1000° C. for 12 hours under constant air flow. After cooling, the resulting powder (Ex4) is sieved and characterized.

Example 5

The characterization of Example 5 will demonstrate that high electrochemical performances are only achieved when targeting a lithium stoichiometry of 1.00±0.01. Lithium overstoichiometry, as usually observed in state-of the art LiCoO$_2$-based materials, lead to systematic impairment of the discharge capacity, C-rate and high voltage stability.

Preparation of Example 5a-5e (noted Ex5a-5e): A cathode powder material is prepared by mixing 88.91 wt. % of LCO-3, 10.94 wt. % Co$_3$O$_4$ with mean particle size of 3 μm, 0.12 wt % of MgO and 0.03 wt % of TiO$_2$. Li$_2$CO$_3$ is further added so as to adjust the final Li:Co (or Li:M) ratio to 1.00 (Ex5a), 1.01 (Ex5b), 1.02 (Ex5c), 1.03 (Ex5d) and 1.04 (Ex5e). The homogeneous mixture are placed in alumina crucibles and heated at 980° C. for 12 hours under constant air flow. After cooling, the resulting powders (Ex5a-5e) are sieved and characterized.

The electrochemical properties of Ex5a-5e are shown in Table 1. The rate discharge capacity DQ7 and DQ8 and the 3 C rate performances are strongly improved when the Li:M ratio decreases and is close to 1.00±0.01. The capacity fading at 4.5V is also significantly improved when the Li:M ratio is near stoichiometry. The electrical conductivity is also strongly decreased when Li:M tends to 1.00 and 3 to 4 orders of magnitude lower compared to LCO-3. These properties are clear evidence supporting the mechanism of "electron insulating in-situ coating" where the amount of segregated Mg and Ti increases when Li:M is near stoichiometry. The benefits of a Li-stoichiometric core and of the Mg and Ti enriched surface for high voltage applications are eventually clearly highlighted.

TABLE 1

4.5 V electrochemical performances and electrical conductivity of Ex5a-5e

| Example | Li:M | Qirr (%) | 3 C rate (%) | DQ7 (mAh/g) | DQ8 (mAh/g) | Capacity fading at 0.1 C (%) | Capacity fading at 1 C (%) | Conductivity at 25° C. (S/cm) |
|---|---|---|---|---|---|---|---|---|
| Ex5a | 1.00 | 1.27 | 93.76 | 192.11 | 187.84 | 2.03 | 2.56 | 8.85E−07 |
| Ex5b | 1.01 | 1.89 | 93.27 | 191.90 | 187.37 | 2.70 | 4.14 | 2.32E−06 |
| Ex5c | 1.02 | 2.67 | 92.53 | 191.34 | 185.86 | 7.49 | 12.92 | 5.59E−04 |
| Ex5d | 1.03 | 2.87 | 91.43 | 190.76 | 183.62 | 8.91 | 11.66 | 1.94E−03 |
| Ex5e | 1.04 | 3.67 | 90.63 | 188.30 | 179.64 | 12.00 | 14.28 | 2.87E−03 |
| LCO-3 | 1.07 | 3.5 | 87.7 | 184.5 | 171.9 | 25.9 | 36.6 | 8.70E−03 |

Characterization of Examples 1-4

Changes in physical and electrochemical properties of the lithium cobalt based oxides prepared according to the present invention have been characterized before and after the second firing used to control and adjust the Li:M stoichiometry.

SEM Analyses

Surface imaging is performed using a scanning electron microscope (SEM) and is shown on FIG. 1. All the samples feature monolithic particle morphology before and after the second firing. Following the second firing step, the surface of the particles undergoes clear changes: the surface of LCO-1, LCO-3 and LCO-4 are covered with dust and debris, which contrasts with the smooth surface of Ex1, Ex2, Ex3 and Ex4 after second firing.

XRD Analyses

The crystal structure of the lithium cobalt based oxides has been investigated by means of X-ray diffraction. XRD patterns of LCO-1 and Example 1 are shown on FIG. 2. All peaks are indexed in the R-3m space group using a rhombohedral cell with usual lattice parameters a=2.815 Å and c=14.05 Å typical of layered $LiCoO_2$ phase. No impurity phases, namely cobalt based oxides $Co_3O_4$ and CoO, are observed.

Likewise, XRD patterns of LCO-3, LCO-4, Ex3 and Ex4 are interpreted using the same structural model and similar lattice parameters. Though containing large surface base contents such as LiOH and $Li_2CO_3$, LCO-1, LCO-3 and LCO-4 XRD patterns don't allow identifying such compounds, suggesting that their content is below XRD detection limit and/or that the surface base are in amorphous forms.

Figure 3:
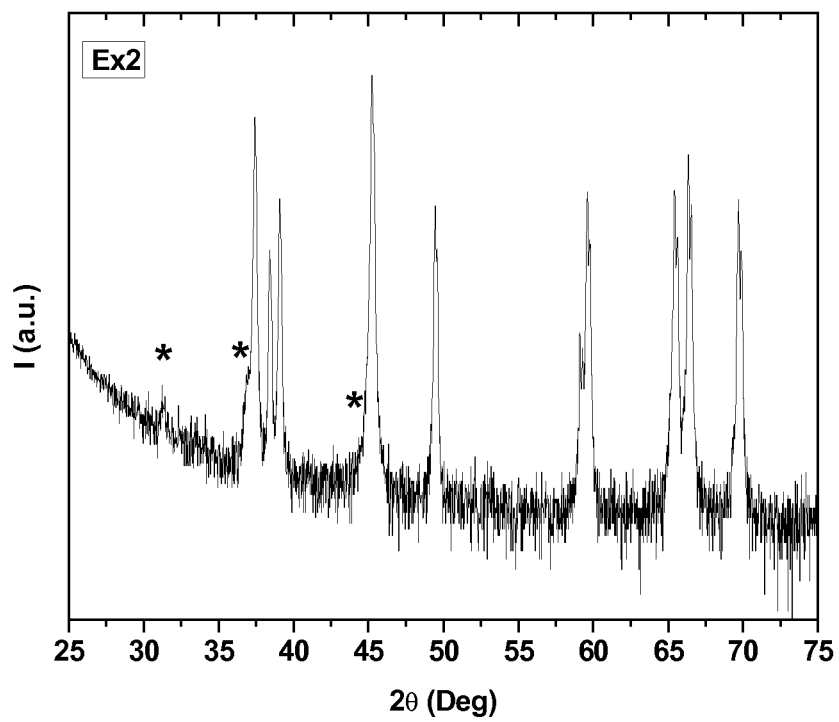
FIG. 3: XRD pattern Example 2. Diffracted intensity is plotted in logarithmic scale as function of 2θ in degrees. Peaks marked by asterisks indicate the presence of a cobalt-based spinel impurity ($Co_3O_4$ indexed in Fd-3m space group with a=8.085 Å).

The XRD pattern of Ex2 is shown on FIG. 3. In addition to the main peaks attributed to the layered $LiCoO_2$-based oxide (R-3m space group) small intensity peaks are observed denoting the presence of cobalt-based spinel impurity amounting to ca. 1.2 wt %, which is in very good agreement with the targeted Li:Co mol ratio of 0.990. Ex2 therefore comprises ca. 99 mol % Li stoichiometrically controlled $LiCoO_2$-based materials and ca. 1 mol % cobalt spinel-based impurity.

For Ex3, the homogeneous substitution of Co by Al is confirmed by the increase of the 'reduced' c/a ratio defined as $(c/(\sqrt{24}a)-1) \times 1000$, being 18.56 and 18.90 for LCO-3 (no Al) and Ex3 (containing 1 mol % Al), respectively. The increase of the c/a ratio upon Al doping of $LiCoO_2$ is in good agreement with other works (such as Myung et al., Solid State Ionics Volume 139, Issues 1-2, 2 Jan. 2001, Pages 47-56 and Gaudin et al., J. Phys. Chem. B, 2001, 105, 8081-8087).

Analysis of Li-Salt Impurities

The surface base and carbon contents of the different materials are listed on Table 2. The base and carbon contents are strongly reduced after the second firing for Ex1, Ex2, Ex3 and Ex4 when compared to LCO-1, LCO-3 and LCO-4. This result supports, as shown by SEM, that the surfaces of LCO-1, LCO-3 and LCO-4 are partly covered with unreacted excess Li salts, such as LiOH and $Li_2CO_3$, and that the surfaces of Ex1, Ex2, Ex3 and Ex4 are mostly free from such impurities.

TABLE 2 total base content and carbon content of the Examples.

| Name | Base content (μmol/g) | Carbon content (ppm) |
|---|---|---|
| LCO-1 | 64.2 | 161 |
| Ex1 | 9.9 | 25 |
| Ex2 | 9.9 | 28 |
| LCO-3 | 99.2 | 338 |
| Ex3 | 5.5 | 10 |
| LCO-4 | 23.1 | 103 |
| Ex4 | 12.0 | 43 |

X-Ray Photoelectron Spectroscopy (XPS) Analysis

The chemical composition of the surfaces of the particles of LCO-1 and Ex1 has been investigated by means of XPS. Full scale XPS spectra are shown on FIG. 4a & b and quantitative results for LCO-1 and Ex1 are listed in Table 3.

TABLE 3 elemental composition of the surface of the grains of LCO-1 and Ex1.

| at. % | LCO-1 | Ex1 |
|---|---|---|
| Li | 21.7 | 15.3 |
| Co | 8.7 | 12.0 |
| O | 41.9 | 37.5 |
| C | 23.1 | 26.5 |
| S | 1.3 | 0.8 |
| Ca | 0.6 | 0.1 |
| F | 0.9 | 0.4 |
| Ti | 0.9 | 1.1 |
| Na | 0.3 | 0.3 |
| Si | Below detection limit | 1.1 |
| P | 0.4 | 0.6 |
| Mg | Below detection limit | 4.4 |

The cobalt 2p and 3p XPS peaks are shown on FIG. 5. Spin-orbit coupling splits the Co2p spectra into two components—$2p_{3/2}$ and $2P_{1/2}$—with an intensity ratio of about 2:1. Each component presents a main line at 780 and 795 eV and a ligand-to-metal charge transfer satellite peak at 790 and 805 eV. The Co3p spectrum also consists of a main line and a satellite at 61 and 71 eV, respectively; $3p_{3/2}$ and $3P_{1/2}$ energy splitting is however too small to be observed. The Co2p and Co3p spectra of LCO-1 and Ex1 are characteristic of $Co^{3+}$ ions of $LiCoO_2$ and exclude the presence of $Co^{2+}$ at the surface of the particles. These observations are in line with previous studies on $LiCoO_2$. (e.g. Daheron et al., J. Phys. Chem. C, 2009, 113, 5843).

Figure 5A:
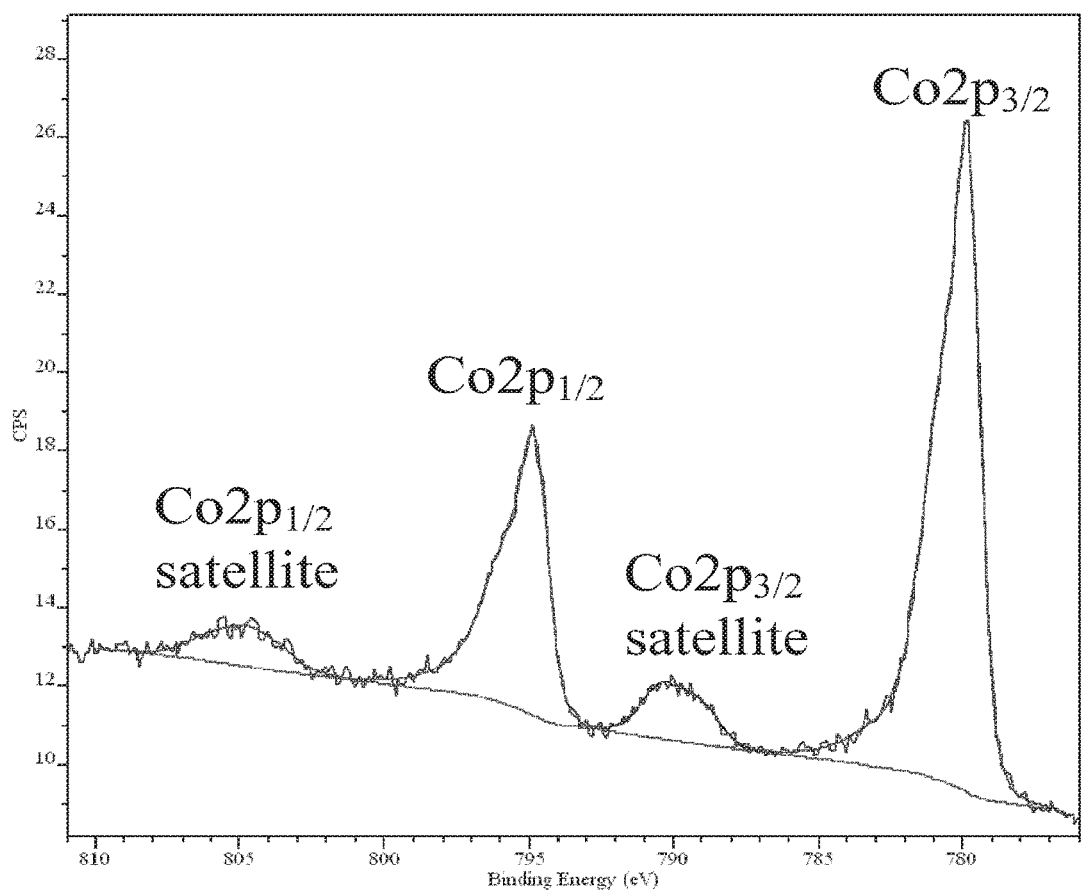
FIGS. 5: (a) and (c) Co2p XPS peaks of LCO-1 and Ex1, respectively. (b) and (d) Co3p, Li1s and Mg2p peaks of LCO-1 and Ex1, respectively.
Figure 5B:
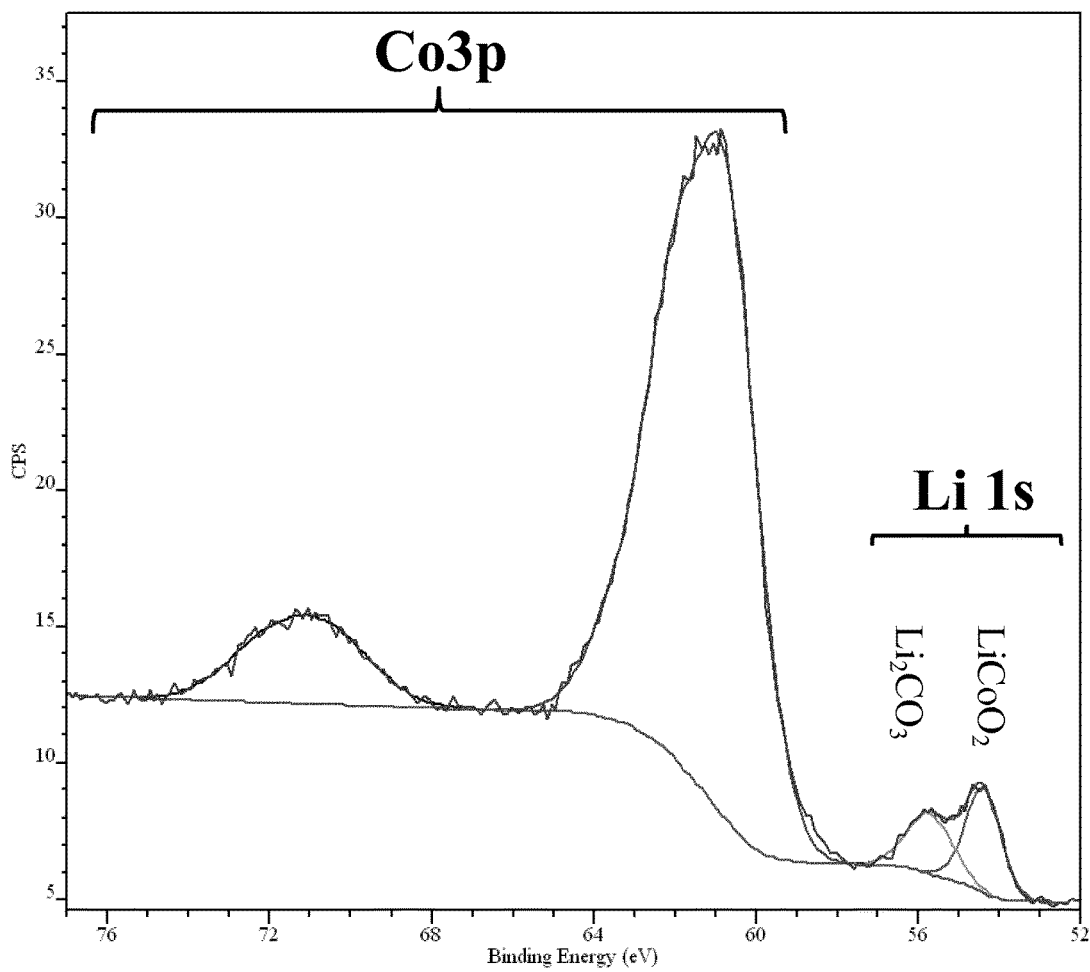
Figure 5C:
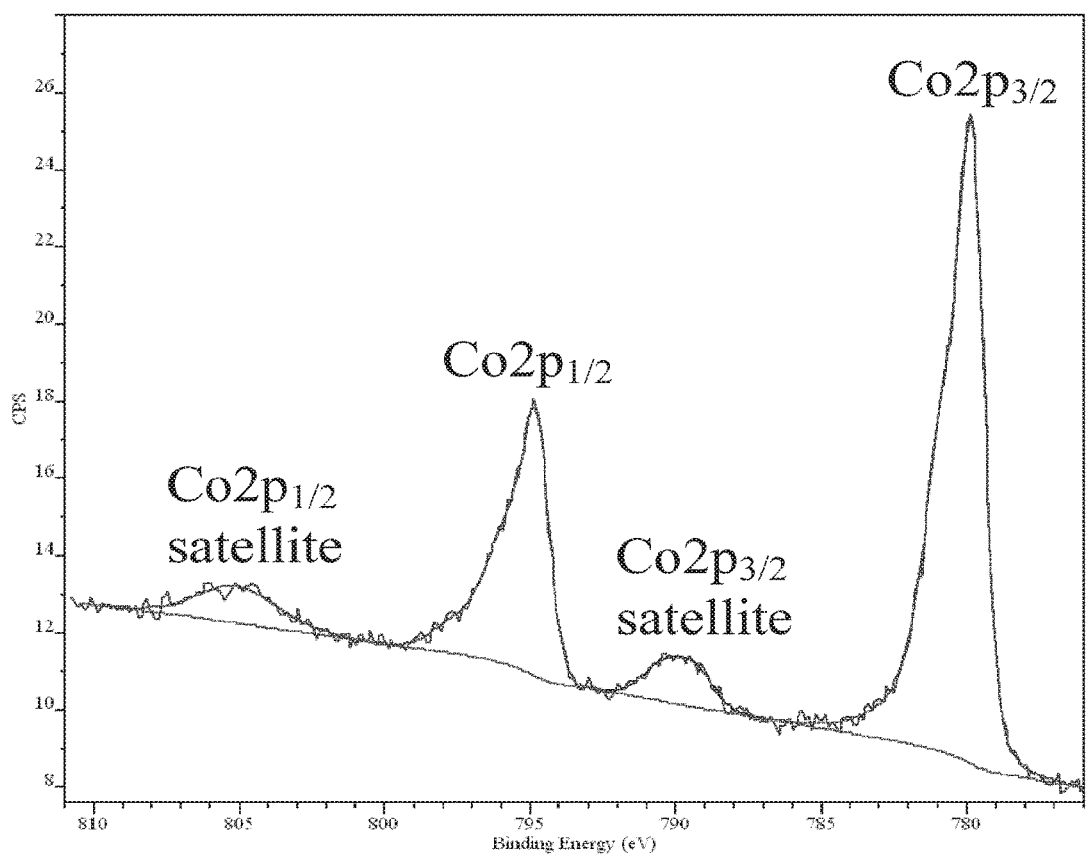
Figure 5D:
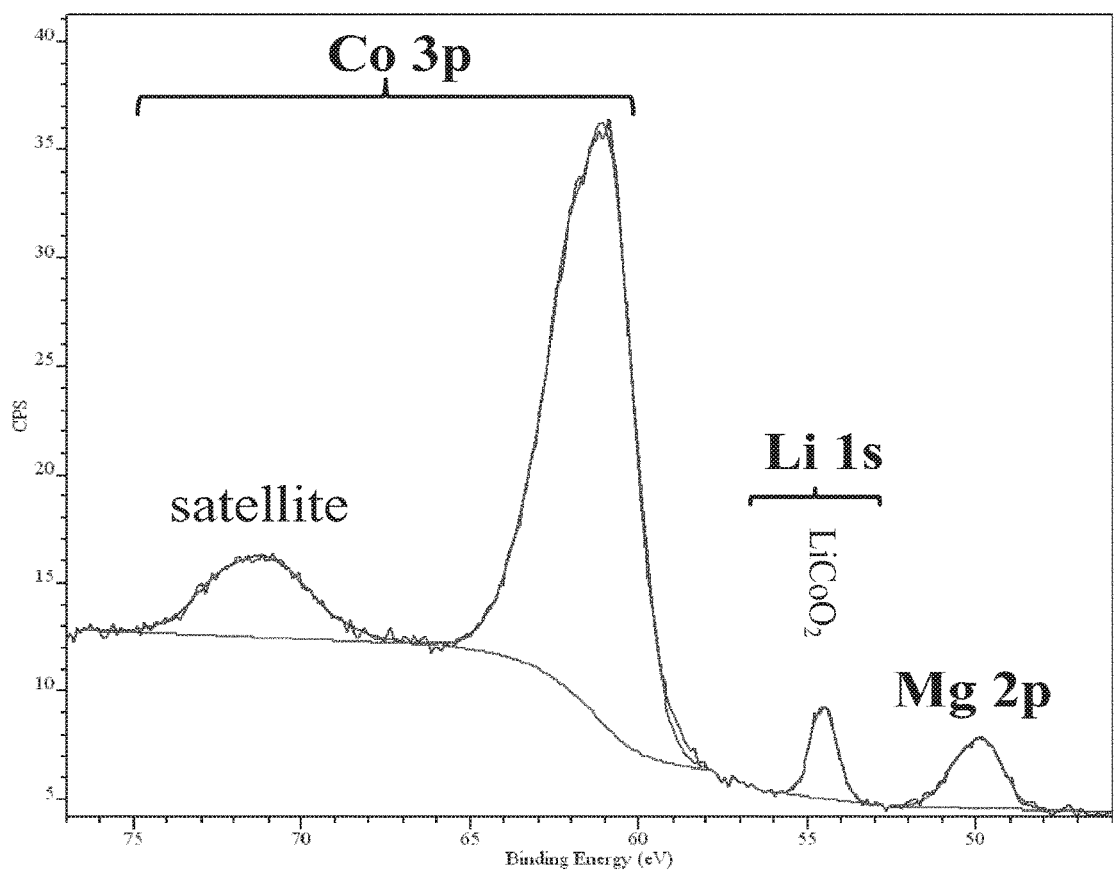
Figure 6:
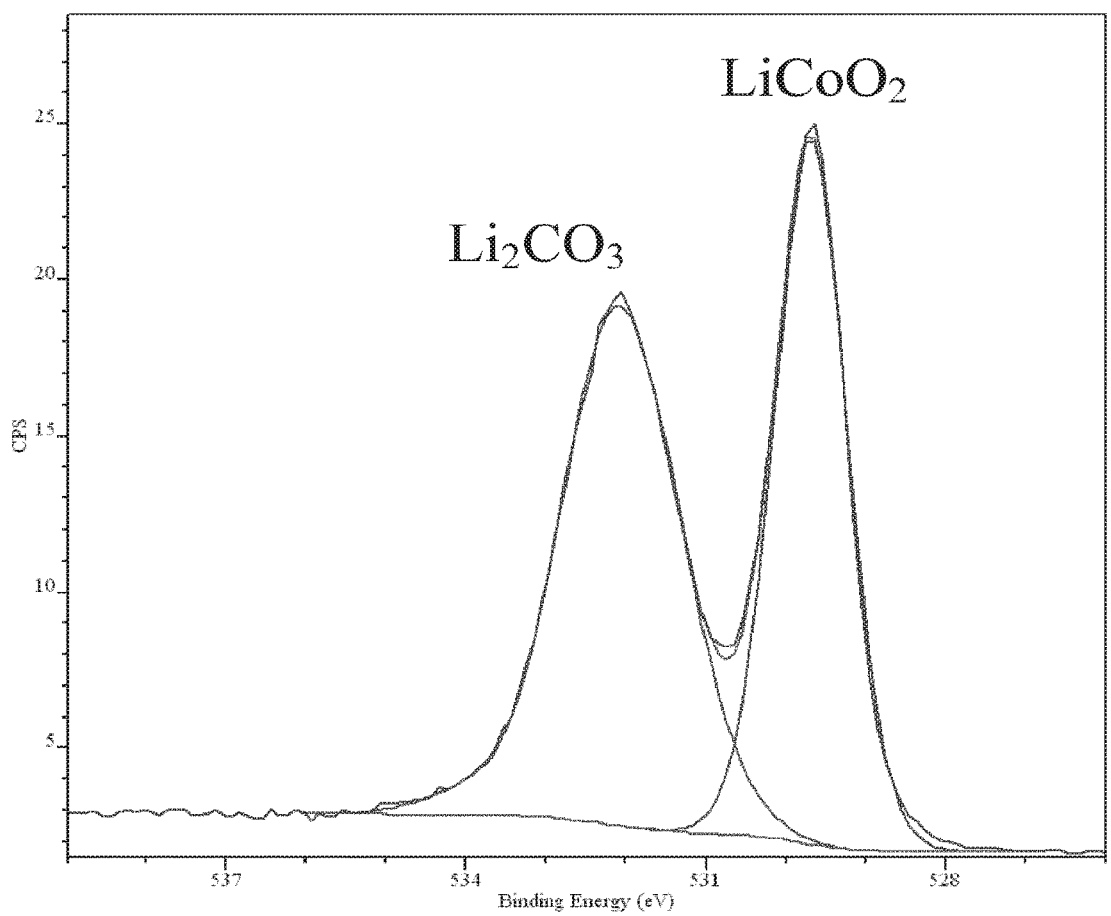
FIGS. 6: (a) and (c) O1s XPS peaks of LCO-1 and Ex1. (b) and (d) C1s XPS peaks of LCO-1 and Ex1. The peak at 285.5 eV corresponds to the hydrocarbon surface contamination.
Figure 6:
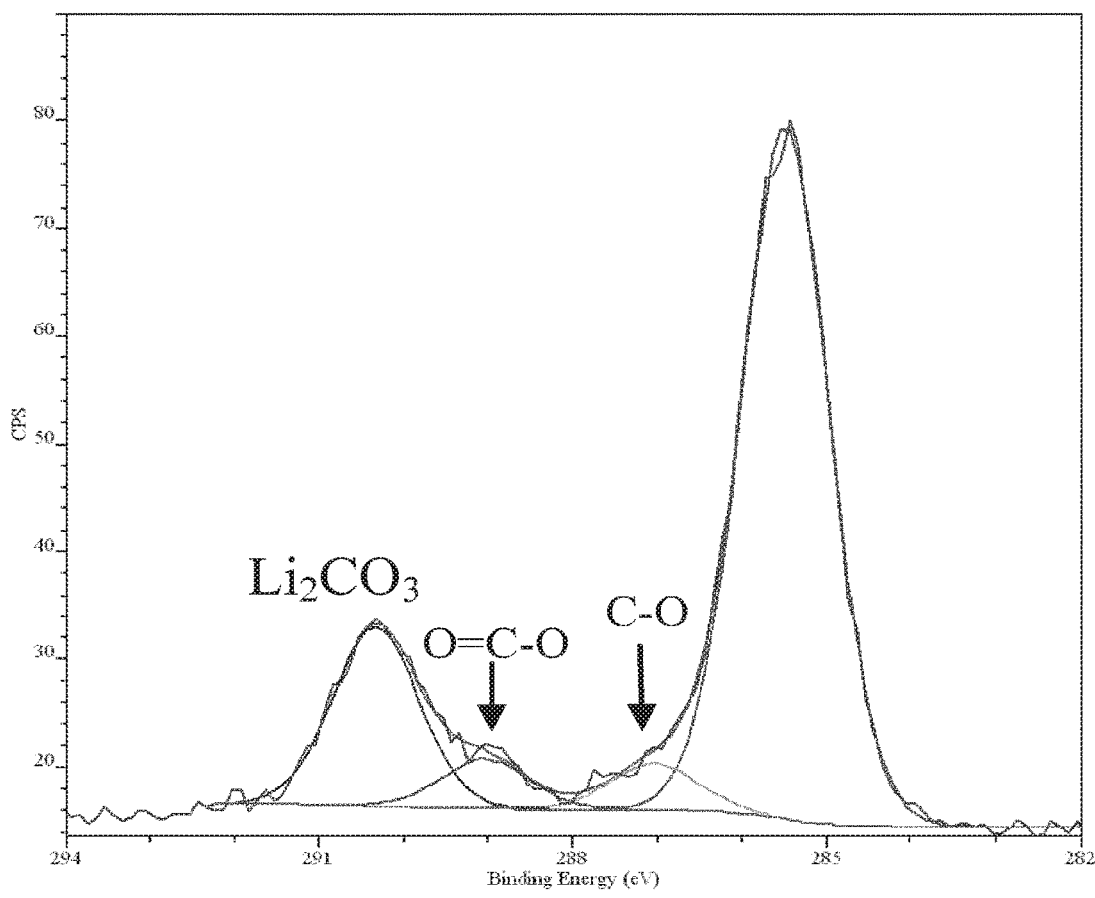
Figure 6C:
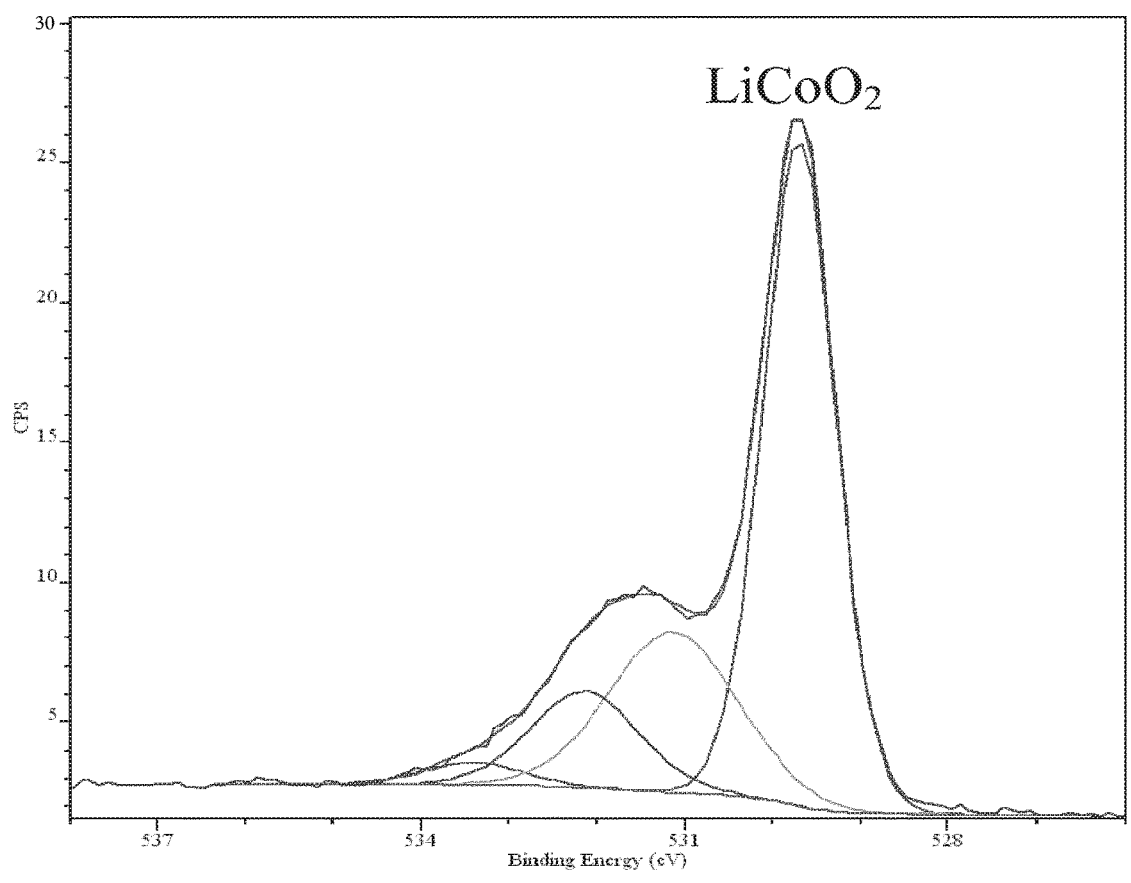
Figure 6D:
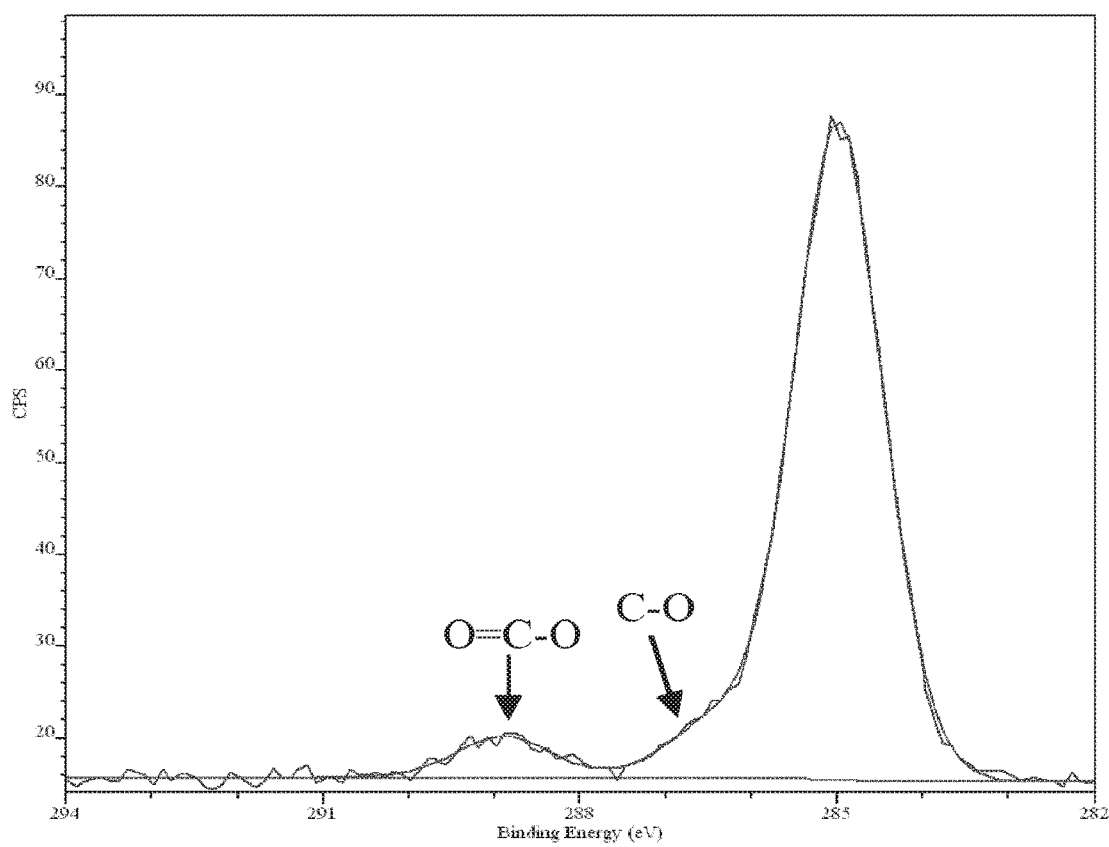

The XPS analysis is however revealing clear differences in the chemical composition of the surface of the particles of LCO-1 and Ex1:

Lithium 1s, oxygen 1s and carbon 1s XPS spectra are shown on FIG. 5 (b) & (d) (Li1s) and FIG. 6 (a) & (c) (O1s) and FIG. 6 (b) & (d) (C1s). Intense peaks from $Li_2CO_3$ are observed for LCO-1 with Li1s, O1s and C1s characteristic binding energies centered on 55.7 eV, 532 eV and 290.2 eV, respectively. $Li_2CO_3$ is estimated to account for 26 at % at the surface of LCO-1 particles. These contributions are not present in Ex1, suggesting that the surface of the particles is mostly free from lithium salts.

A well resolved Mg2p XPS peak around 50 eV is observed only for Ex1 as shown on FIG. 5d. Though LCO-1 and Ex1 feature identical Mg:Co ratio equal to ca. 0.005, the Mg:Co ratio measured at the surface of Ex1 is about 0.37, showing an enhancement by about 2-orders of magnitude over LCO-1. The MgO-like environment is confirmed by the typical Mg KLL Auger structure (cfr. Davoisne et al, Astronomy and Astrophysics, 2008, 482, 541) observed in the 300-400 eV range, as shown on FIG. 7(c). The absence of magnesium at the surface of LCO-1 suggests that Mg remains within the structure in LCO-1.

Figure 7A:
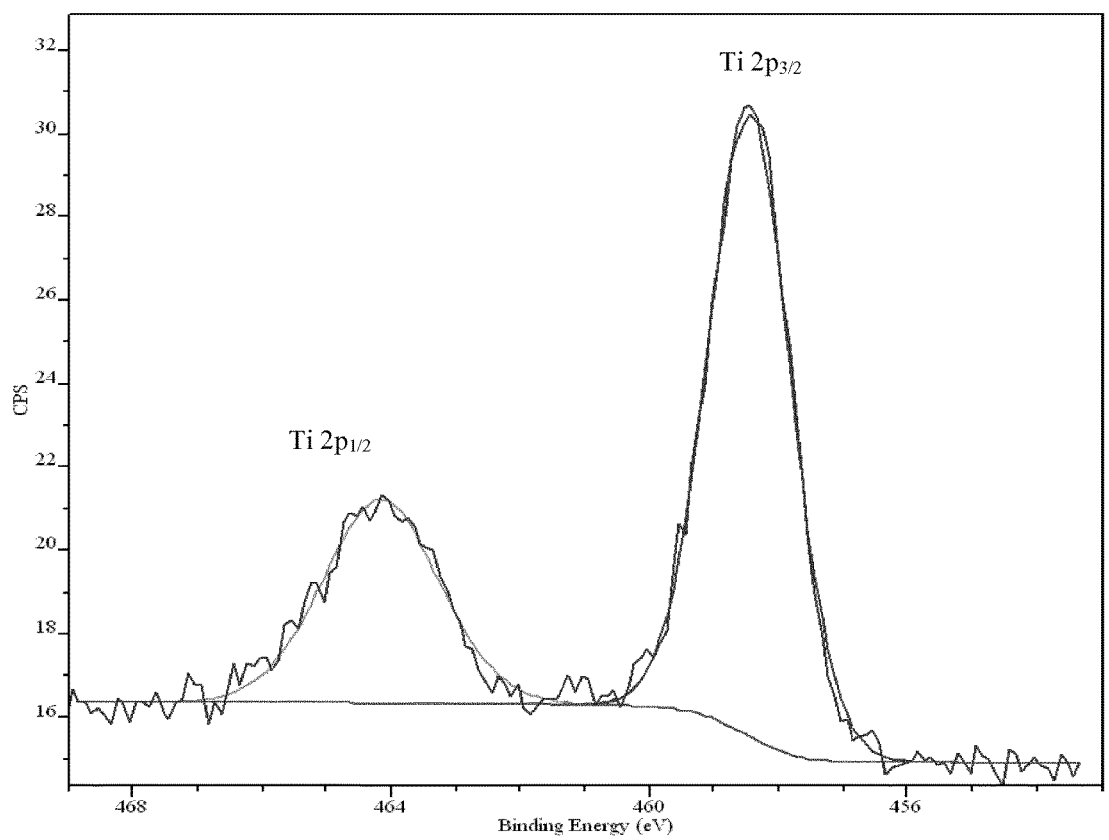
FIGS. 7: (a) and (b) Ti2p XPS peaks of LCO-1 and Ex1, respectively. (c) Mg KLL Auger spectrum of Ex1.
Figure 7B:
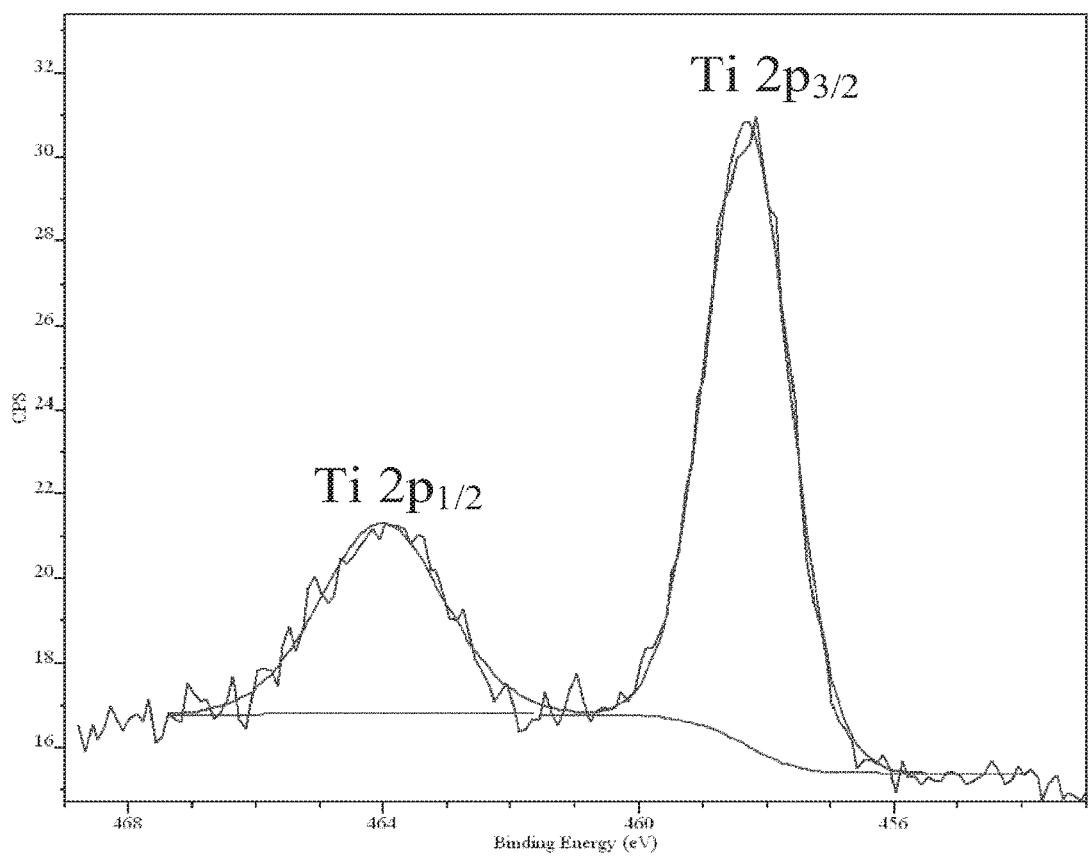
Figure 7C:
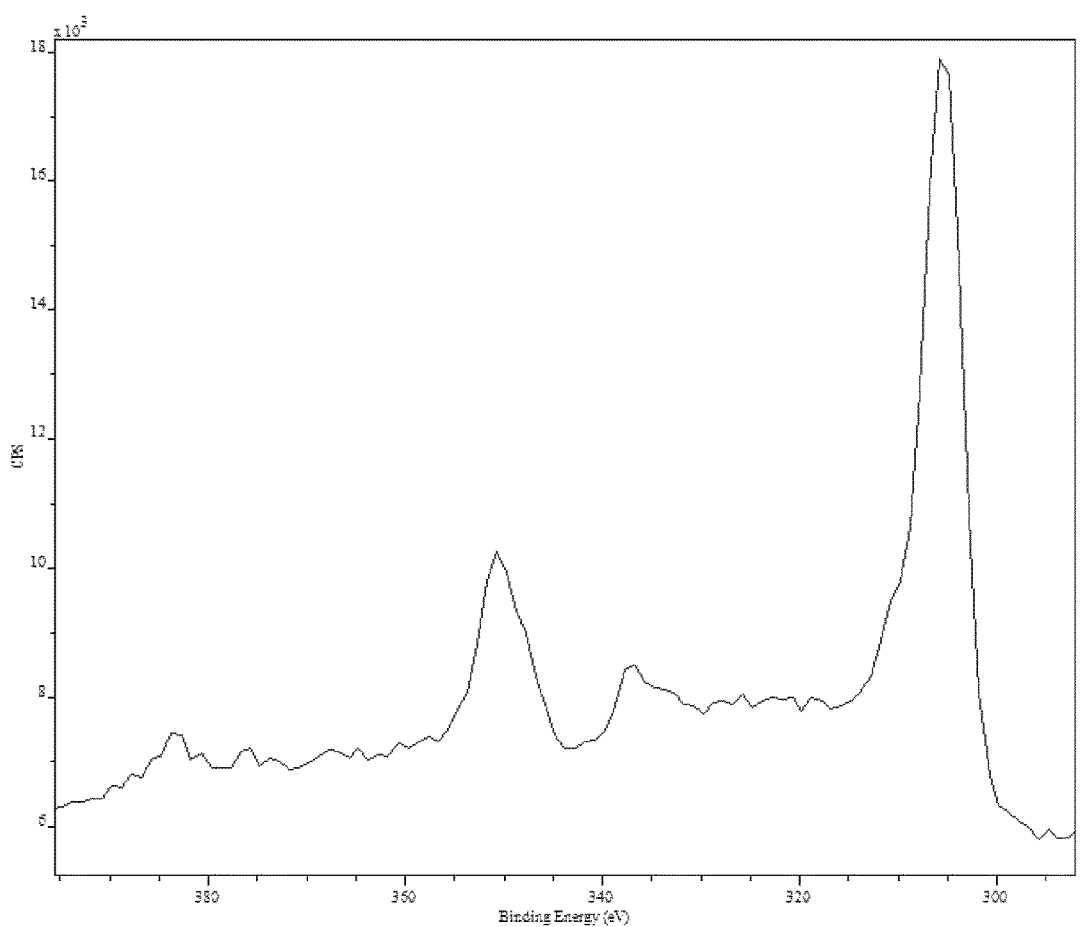

FIGS. 7 (a) and (b) shows XPS spectra of Ti2p with two components $Ti2p_{3/2}$ and $Ti2p_{5/2}$ at 458.5 and 464 eV, respectively for both samples. These binding energies are in good agreement with the exclusive presence of $Ti^{4+}$ in six-fold oxygen environments (see also: Tanaka et al., Corrosion Science, 2008, 50, 2111 and El Ouatani et al., Journal of The Electrochemical Society, 2009, 156, A4687). Possible host structures for $Ti^{4+}$ in the present systems are $TiO_2$ and $Li_2TiO_3$. Likewise, the Ti:Co ratios measured at the surface of LCO-1 and Ex1 are close to 0.1 which is more than 40 times the Ti:Co blend ratio (ca. 0.0025). The Ti amount at the surface of Ex1 particles is also slightly higher when compared to LCO-1.

Figure 8:
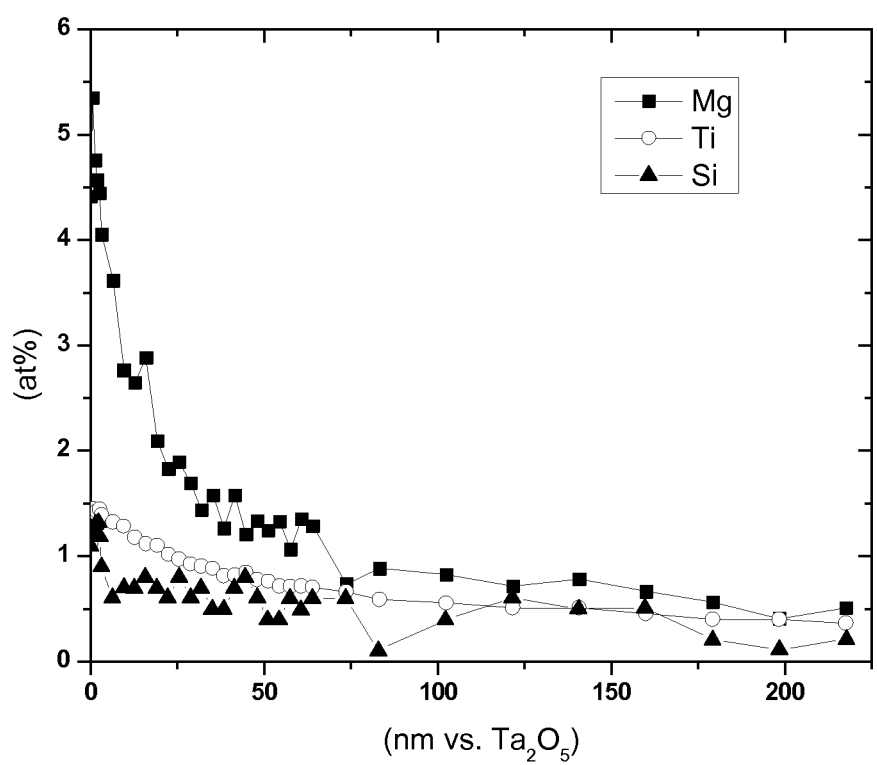
FIG. 8: evolution of the Mg, Ti and Si atomic percentage of Ex1 as function of the etching depth normalized using $Ta_2O_5$ reference.

The evolution of Mg and Ti as function of particle depth has been monitored for Ex-1 by means of XPS depth profiling as shown on FIG. 8. The concentration of Mg and Ti decreases rapidly over the first 50 nm of the particles. The amounts of Mg and Ti do not decrease down to zero, as could be expected, even not after a long time of etching. This is due to side effects of argon ion sputtering, where the implantation of argon ions deep inside the sample results in the forced mixing of atoms of subsequent layers. The larger content of Mg and Ti of Ex1 compared to LCO-1 and the depth profiling experiments suggest an in-situ coating mechanism where Mg and Ti are expelled from the lithium cobalt oxide bulk structure during the Li:Co equilibration (second) firing and are accumulated at the surface of the $LiCoO_2$ particle in oxidized form. The in-situ segregation mechanism of Mg and Ti will be further evidenced by means of electrical conductivity measurements.

Electrical Conductivity

The electrical conductivity of the different materials is listed in Table 4.

TABLE 4 electrical conductivity

| Sample | Conductivity (S/cm) |
| --- | --- |
| LCO-1 | $4.50 \times 10^{-3}$ |
| Ex1 | $6.37 \times 10^{-6}$ |
| Ex2 | $7.32 \times 10^{-6}$ |
| LCO-3 | $8.70 \times 10^{-3}$ |
| Ex3 | $1.52 \times 10^{-6}$ |
| LCO-4 | $1.30 \times 10^{-3}$ |
| Ex4 | $2.45 \times 10^{-6}$ |

The electrical conductivity of Ex1 to 4 is three orders of magnitude lower than for the corresponding lithium doped cobalt oxides parents LCO-1, LCO-3 and LCO-4. It is the author's opinion that the lower conductivity originates from two contributions:

i) the reduction of bulk structural defects, as evidenced by $^7$Li NMR (see below), enhancing the band insulator properties of Li stoichiometric $LiCoO_2$ with Li:Co=1.00, and, ii) in-situ coating of $LiCoO_2$ particles with insulating Co, Mg and Ti oxide-based species occurring during the second firing of Ex1, Ex2, Ex3 and Ex4. The latter is supported by the very low electrical conductivity of commercially available MgO (Kyowa Chemicals) and $TiO_2$ (Cosmo Chemicals KA300), respectively measured to be below $10^{-8}$ S/cm and $6.02 \times 10^{-7}$ S/cm. As relevant for Ex2 containing cobalt based spinel impurities, it is commonly accepted that the conductivity of $Co_3O_4$ is below $10^{-6}$ S/cm.

Pressed Density

The pressed density of the parent phases and examples have been measured and results are shown in Table 5.

TABLE 5 pressed density

| Sample | Avg. Particle Size (μm) | Pressed density (g/cm$^3$) |
| --- | --- | --- |
| LCO-1 | 20 | 3.77 |
| Ex1 | 20 | 3.76 |
| Ex2 | 20 | 3.76 |
| LCO-3 | 18 | 3.80 |
| Ex3 | 16 | 3.90 |
| LCO-4 | 6 | 3.44 |
| Ex4 | 6 | 3.42 |

The pressed density is measured as follows: 3 grams of powder is filled into a press mold with a diameter "d" of 1.300 cm. A uniaxial load of 2.8 t, corresponding to a pressure of 207 MPa, is applied for 30 seconds. After relaxing the load, the thickness "t" of the pressed powder is measured. The pellet density is then calculated as follows: $3/(\pi \times (d/2)^2 \times t)$ in g/cm$^3$.

Figure 4:
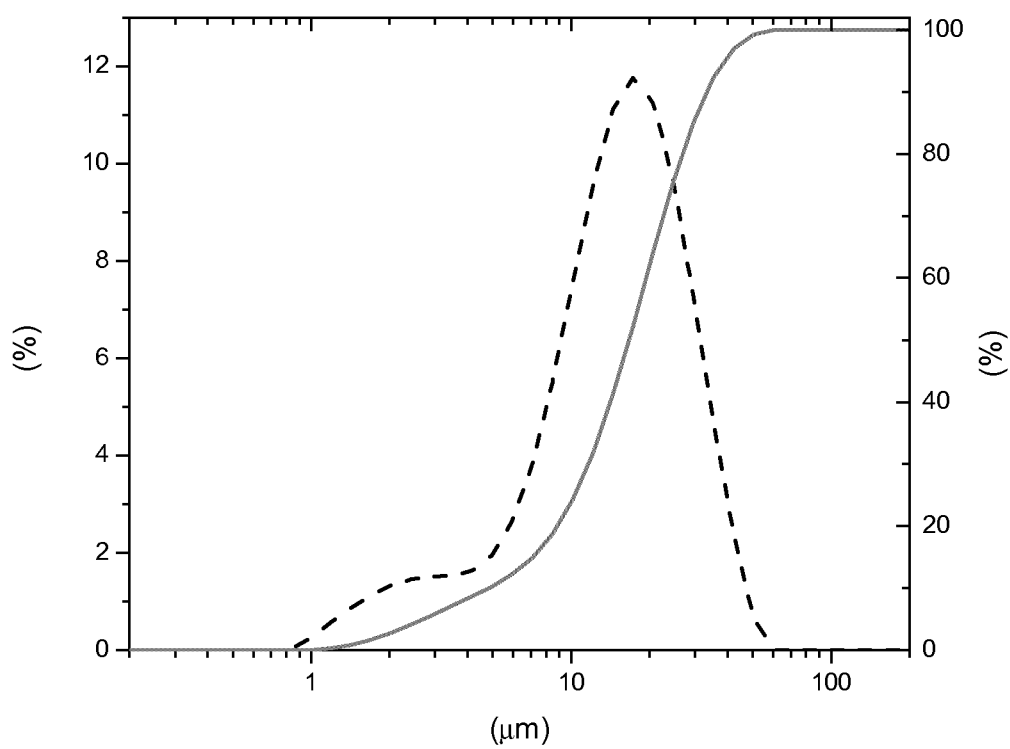
FIG. 4: the evolution of volume distribution (dashed line, left scale) and cumulative volume distribution (solid line, right scale) as function of the particle size of Ex3.
Figure 4A:
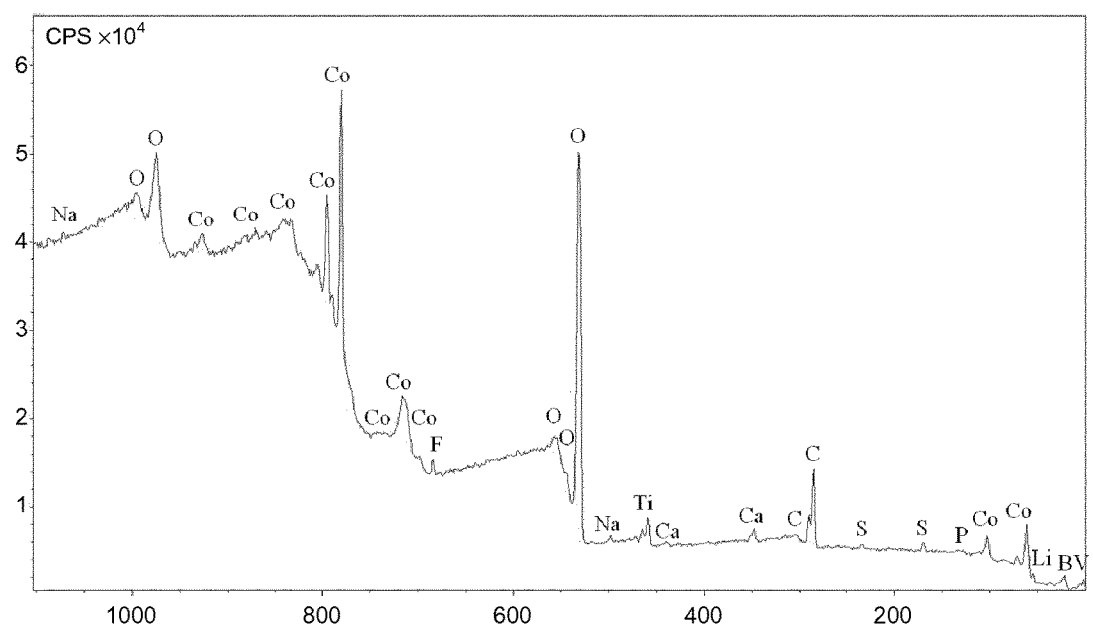
FIG. 4a & b: full scale XPS spectra (10000 Counts per second vs. Binding energy (eV)) for (4a) LCO-1 and (4b) Ex1.
Figure 4B:
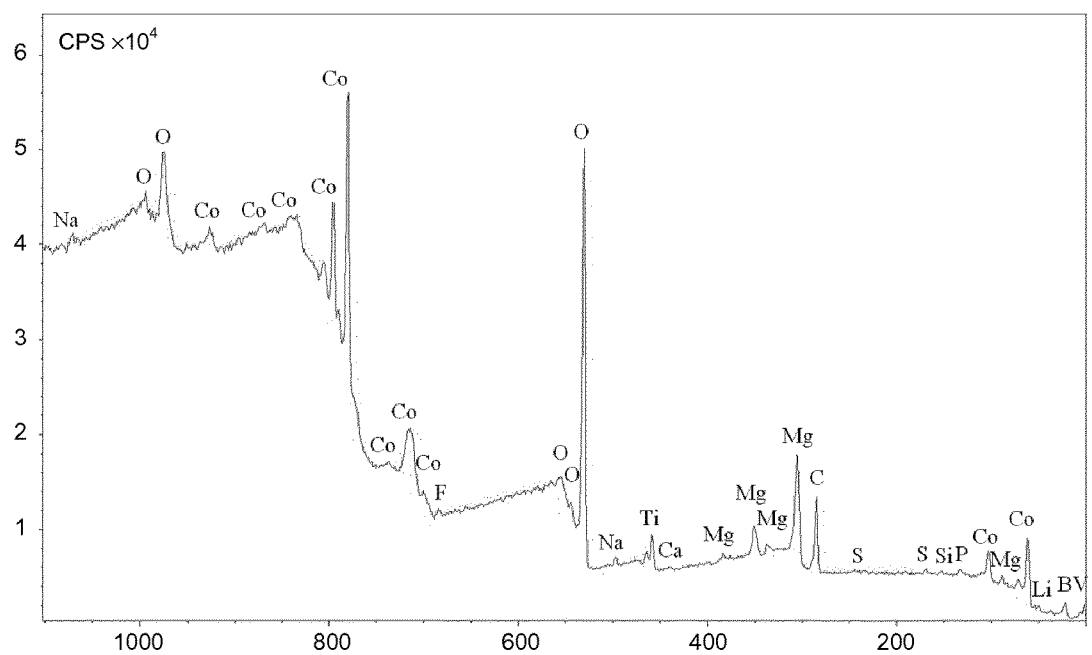

All the materials feature very high pressed densities in excess of 3.40 g/cm$^3$ for LCO-4 and Ex4 with an average particle size of 6 μm and in excess of 3.75 g/cm$^3$ for LCO-1, LCO-3, Ex1, Ext and Ex3 with an average particle size above 15 μm. The pressed density of Ex3 is increased by 0.1 g/cm$^3$ when compared to LCO-3 which is attributed to the ability of the 3 μm particles to accommodate the vacancies resulting from the packing of 18 μm particles. FIG. 4 shows the evolution of volume distribution and cumulative volume distribution as function of the particle size for Ex3. Surprisingly, Ex3 retains a bimodal particle size distribution after the second firing where the centers of mass of the two contributions are around 3 and 18 μm. The volume fraction of the 3 μm contribution, determined by fitting the experimental data with two Gaussian functions, amounts to 13% in good agreement with the initial composition of 3 and 18 μm particles. No agglomeration of 3 and 18 μm particles occurs upon second firing which is believed to be prevented by either or both of the two factors: (a) the accumulation of Mg and Ti species at the surface of the particles as previously evidences by XPS and (b) controlling the lithium stoichiometry which prevent further growth of particles by "lithium-flux effect". Efforts to preserve the bimodal distribution of samples refired with excess lithium (final Li:Co>1.01) and without Mg and Ti dopants failed and large particle agglomeration and coalescence are observed resulting in strong decrease of the pressed density.

Figure 12:
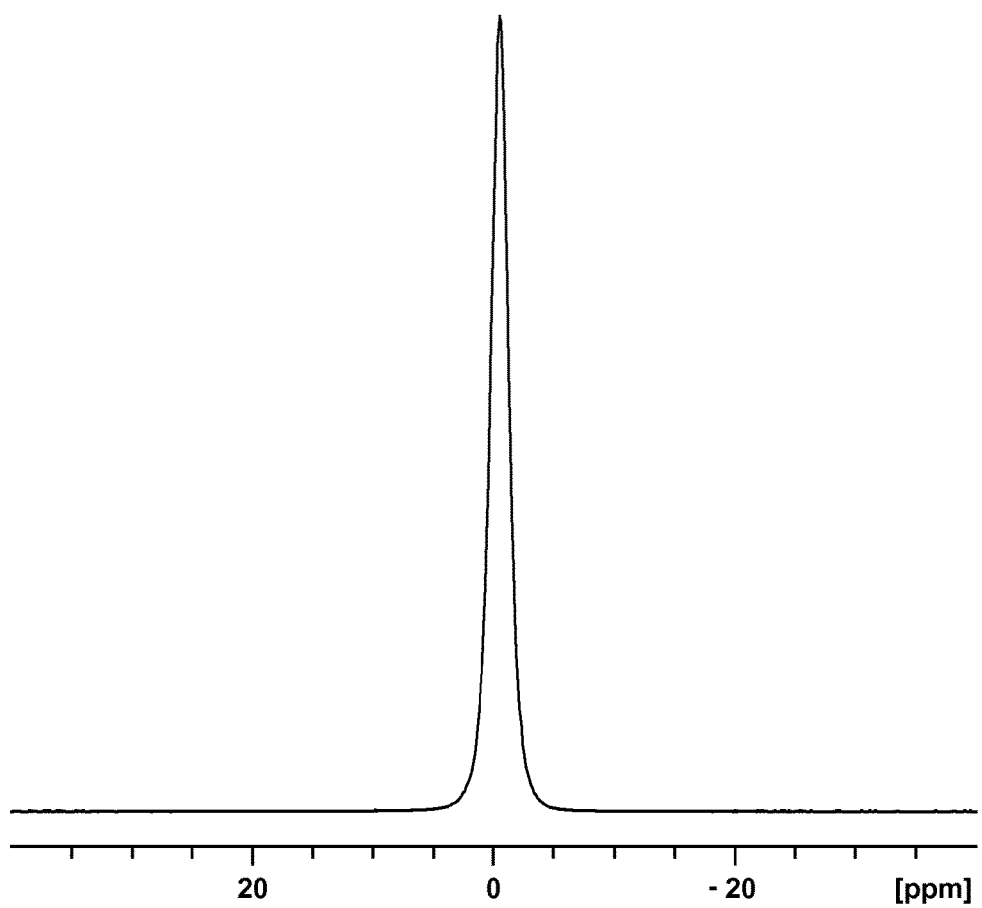
FIG. 12: $^7$Li MAS NMR spectrum of Ext (116 MHz, spinning 30 kHz, synchronized echo).
Figure 13:
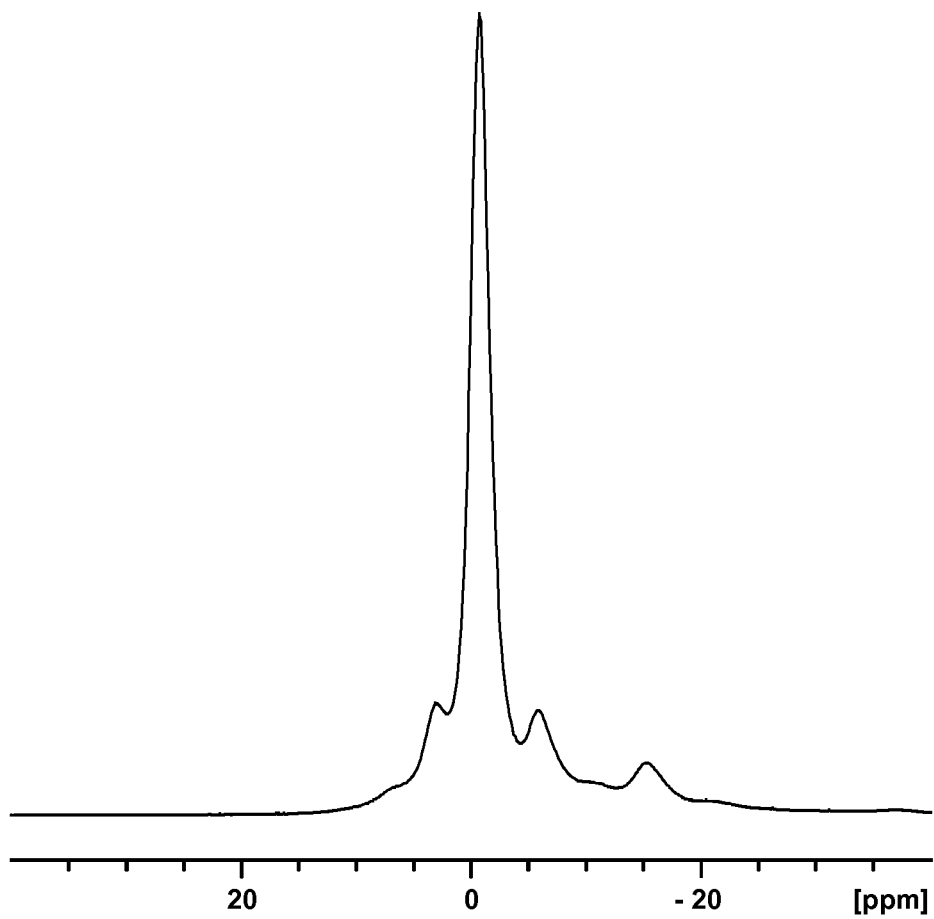
FIG. 13: $^7$Li MAS NMR spectrum of LCO-3 (116 MHz, spinning 30 kHz, synchronized echo).
Figure 14:
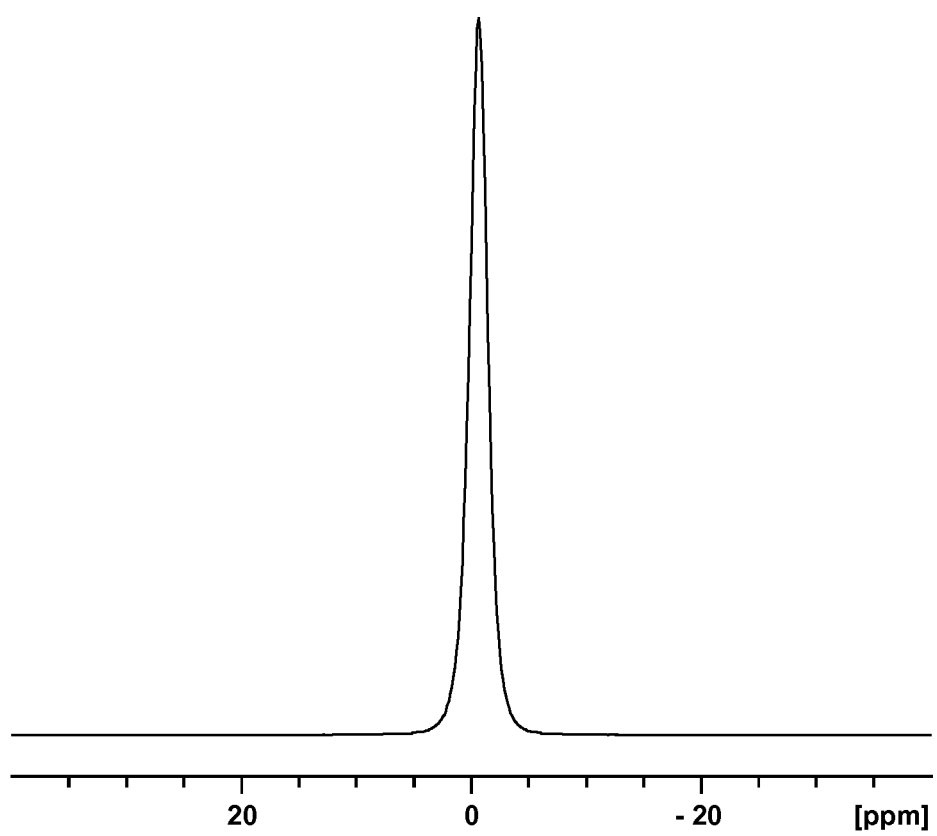
FIG. 14: $^7$Li MAS NMR spectrum of Ex3 (116 MHz, spinning 30 kHz, synchronized echo).
Figure 15:
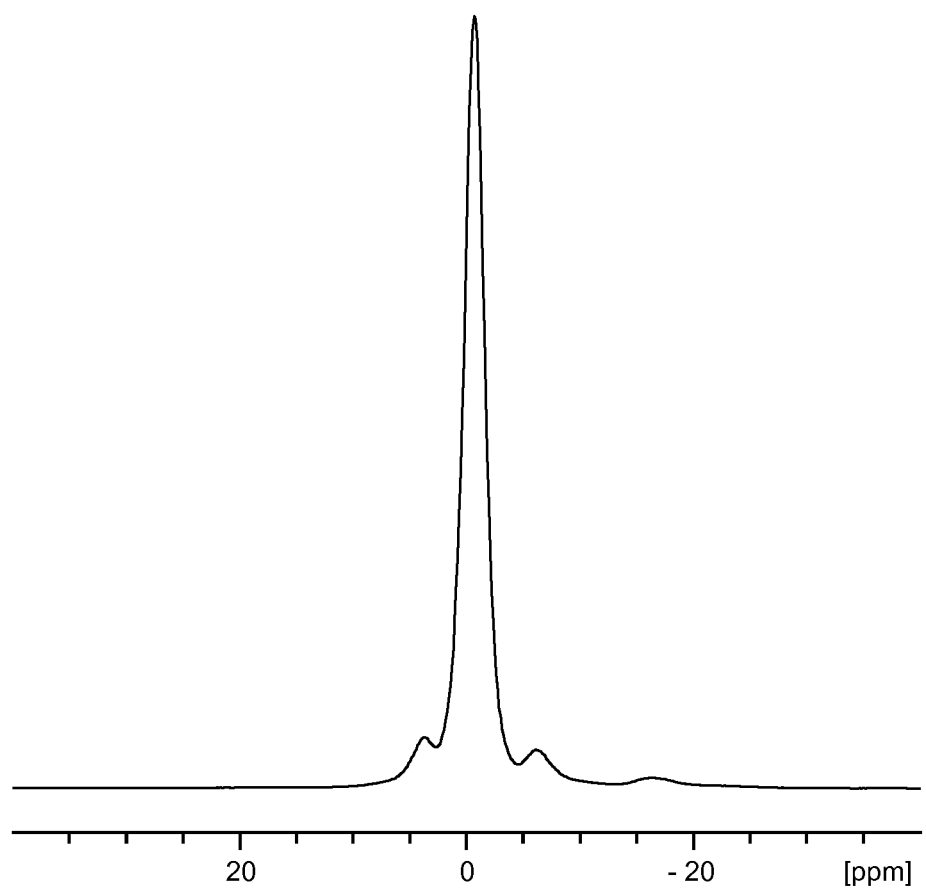
FIG. 15: $^7$Li MAS NMR spectrum of LCO-4 (116 MHz, spinning 30 kHz, synchronized echo).
Figure 16:
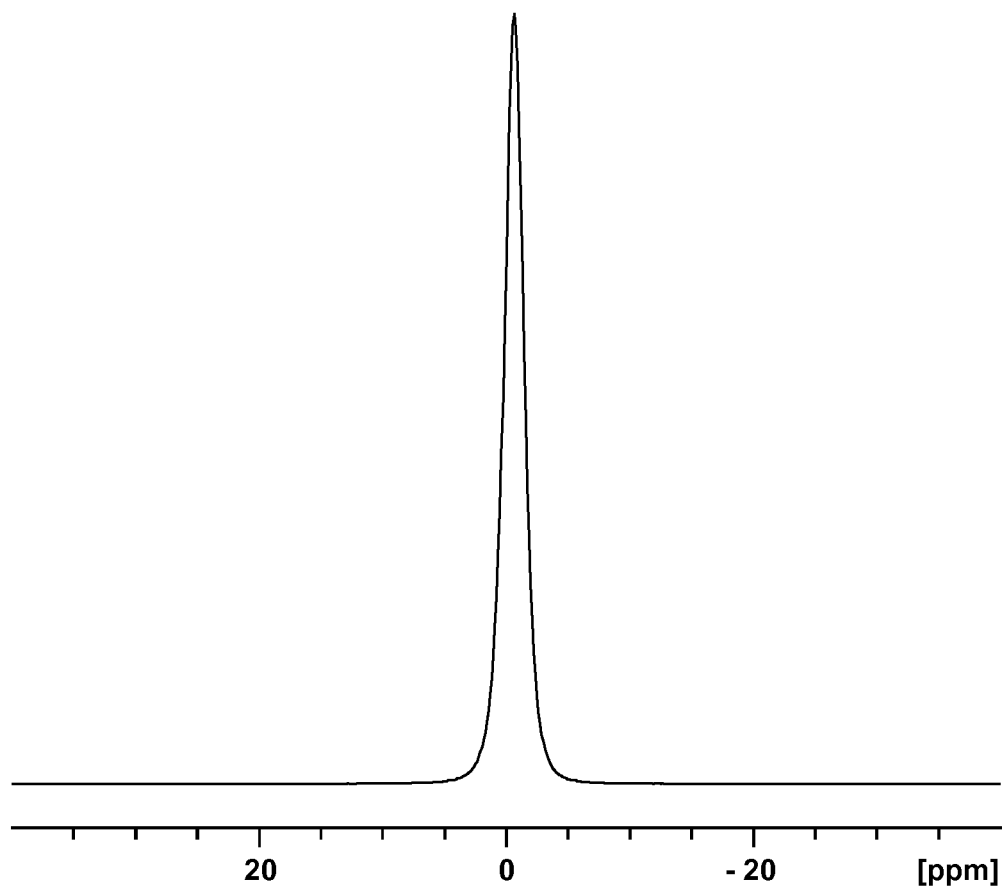
FIG. 16: $^7$Li MAS NMR spectrum of Ex4 (116 MHz, spinning 30 kHz, synchronized echo).

$^7$Li MAS NMR $^7$Li magic angle spinning nuclear magnetic resonance (MAS NMR) spectra of the different Examples are displayed on FIG. 9 for LCO-1, FIG. 10 for Ex1, FIG. 12 for Ex2, FIG. 13 for LCO-3, FIG. 14 for Ex3, FIG. 15 for LCO-4 and FIG. 16 for Ex4.

One can distinguish two types of patterns:

LCO-1, LCO-3 and LCO-4 have a complex $^7$Li MAS NMR pattern with multiple contributions. In addition to the main diamagnetic contribution centered on ca. −0.5 ppm and related spinning sidebands, LCO-1 spectra feature multiple paramagnetic contributions at ca. 185 ppm, 5 ppm, −7 ppm and −16 ppm denoting several different paramagnetic electron-spin metal environments for lithium ions.

On the other hand, Ex1, Ex2, Ex3 and Ex4 features a unique Li resonance centered on −0.5 ppm±0.25 ppm and related spinning sidebands.

The sharp peak centered on −0.5 ppm is attributed to lithium ions surrounded by only trivalent diamagnetic $Co^{3+}$ ($t_{2g}^6 e_g^0$) ions as reported in literature (cf. Levasseur et al., Solid State Ionics 2000, 128, 11). A unique Li site solely surrounded by diamagnetic trivalent metal ions is therefore observed for Ex1, Ex2, Ex3 and Ex4.

For LCO-1, LCO-3 and LCO-4, additional paramagnetic contributions at ca. 185 ppm, 5 ppm, −7 ppm, −16 ppm and −40 ppm are resulting from structural defects induced by two main contributions:

- lithium overlithiation of layered lithium cobalt-based oxides favors, for local charge conservation, the presence of oxygen deficiency leading to $Co^{3+}$ ions occupying square-based pyramids and having intermediate paramagnetic spin state configuration, with unpaired electron in the $e_g$ orbital as described in S. Levasseur, Chem. Mater. 2003, 15, 348-354, and,
- effect of dopants inducing the presence of cobalt ion with different spin and valence states. For example, recent works evidenced that $Mg^{2+}$ substitution for $Co^{3+}$ in $LiCoO_2$ results in substantial oxygen deficiency (see: Wenbin Luo et al., J. Electrochem. Soc., 2010, 157, 782). Likewise, this oxygen deficiency favors the presence of paramagnetic intermediate spin state $Co^{3+}$ ions. It can also be reasonably assumed that Ti substitution for Co will either induce $Ti^{4+}$ paramagnetic impurities or $Co^{2+}$ paramagnetic impurities when present in $Ti^{4+}$ valence state, because of local charge conservation reasons.

The $^7$Li MAS NMR spectrum of Ex2, despite the presence of spinel-based impurity still features a unique resonance around −0.5 ppm. This characteristics clearly establishes that Ex2, though targeting a Li:Co=0.99, comprises a stoichiometrically controlled $LiCoO_2$ where Li ions accommodate a trivalent diamagnetic metal surrounding and a lithium-free spinel impurity, most probably present at the surface of the particles.

In addition, substitution of the $Co^{3+}$ by $Al^{3+}$, both trivalent diamagnetic metal ions, does not modify the $^7$Li MAS NMR signal of Ex3, which conserves a unique resonance around—0.5 ppm, unambiguously confirming that lithium ions occupy a unique site solely surrounded by trivalent diamagnetic metals. Likewise, this finding can be extended to substitution of $Co^{3+}$ ions by trivalent diamagnetic metals such as $Al^{3+}$, $Ga^{3+}$ and $B^{3+}$ that will not modify the $^7$Li MAS NMR signal of Li-stoichiometric $LiCo_{1-a}M'_aO_2$ with M'=Al, B and Ga.

Figure 11:
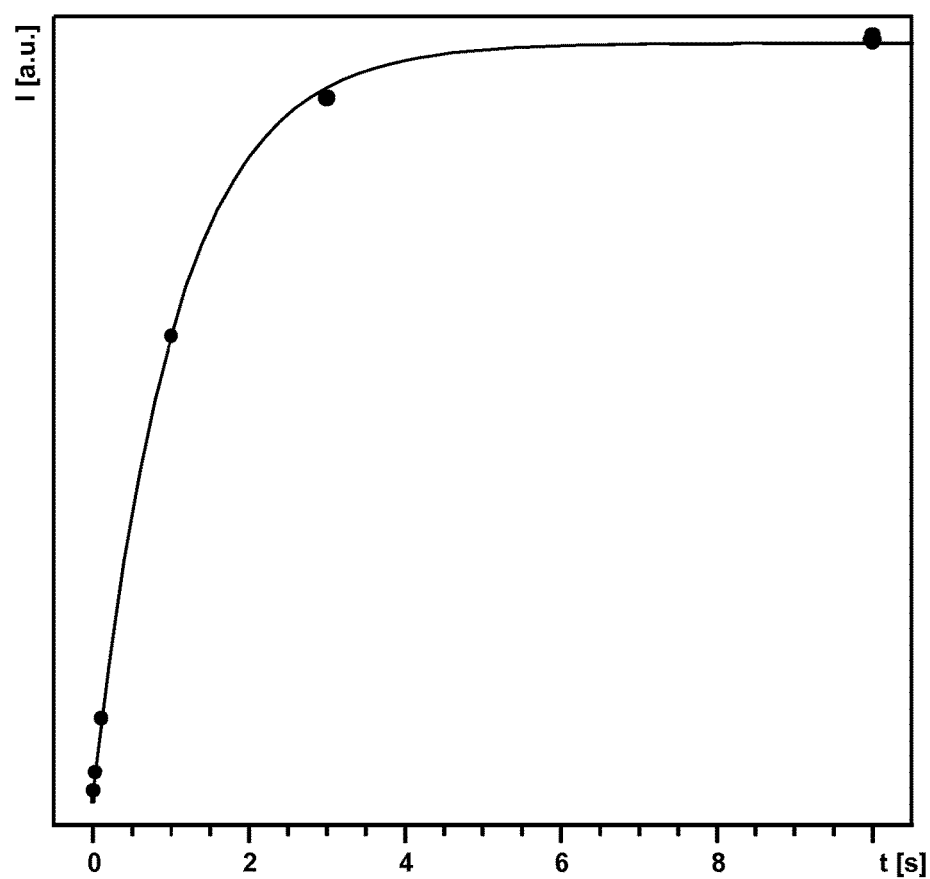
FIG. 11: evolution of the magnetization recovery (arbitrary units) as function of the recovery time (s). The solid line is a single exponential fit of the magnetization recovery as function of time $I[t]=I[0](1-2*A*exp(-t/T1))$.

The relative absence of structural defects is further characterized by measuring the T1 spin-lattice relaxation time as shown in Table 6. The T1 value of LCO-1, LCO-2 and LCO-4 is not defined and cannot be accurately determined due to several spin-lattice relaxation mechanisms. The characteristic relaxation time of each individual mechanism is however shorter than 0.1 s. On the other hand, T1 values for Ex1-4 are successfully determined by a single exponential fit of the magnetization recovery as shown on FIG. 11.

Both the single $^7$Li MAS NMR contribution and longer T1 value demonstrate the relatively low concentration of structural defects in Ex1, Ex2, Ex3 and Ex4 when compared to LCO-1, LCO-3 and LCO-4.

TABLE 6

Spin-lattice relaxation time T1 values for the different samples

| Name | Number of contributions | NMR T1 value (s) |
|---|---|---|
| LCO-1 | Multiple | Not defined |
| Ex1 | Single | 1.1 |
| Ex2 | Single | 1.0 |
| LCO-3 | Multiple | Not defined |
| Ex3 | Single | 0.3 |
| LCO-4 | Multiple | Not defined |
| Ex4 | Single | 0.4 |

In conclusion, $^7$Li MAS NMR, XPS analyses and electrical conductivity allow to make an unambiguous description of the structure of Ex1, Ex2, Ex3 and Ex4 materials which comprises a core with Li stoichiometry control where Li occupy a single site surrounded by trivalent diamagnetic metals such as low spin $Co^{3+}$ ($t_{2g}^6 e_g$) and $Al^{3+}$, and an electron insulating surface comprising inorganic metal oxides comprising Mg, Ti, Si, Co and Li.

Electrochemical Performances

The electrochemical performances of Examples 1-4 are shown in Table 7. The electrochemical properties are unexpectedly improved compared to LCO-1, LCO-3 and LCO-4. At 4.3V, Ex1, Ex2, Ex3 and Ex4 show very small irreversible capacity and better rate performance compared to LCO-1, LCO-3 and LCO-4. 4.5V high voltage performances of Ex1, Ex2, Ex3 and Ex4 are enhanced and feature very high capacity and very good cycle life. 4.6V performances of Ex1, Ex2, Ex3 and Ex4 are exceptional with a capacity fading at 1 C below 40% and are, to the extent of authors knowledge, unequalled in literature. These data show a perfect correlation between the relatively low defect concentration as evidenced by $^7$Li MAS NMR and the improved high voltage properties of stoichiometrically controlled $LiCo_{1-x}M_xO_2$.

The energy density at 0.1 C for 4.5V and 4.6V, defined as the product of the pressed density, average voltage and discharge capacity, of Ex1, Ex2, Ex3 and Ex4 are enhanced when compared to LCO-1, LCO-2 and LCO-3, respectively. The association of high energy density and improved cycle life make Ex1, Ex2, Ex3 and Ex4 suitable for applications such as portable electronics. One can notice that the capacity fading of Ex4, though being significantly improved compared to LCO-4, is higher than Ex1, Ex2 and Ex3. This effect is a direct consequence of the lower particle size of Ex4 which causes a thinner surface layer—as the amount of added Mg and Ti is similar for all samples—offering less protection towards electrolyte decomposition.

TABLE 7 electrochemical properties at 4.5 V and 4.6 V.

| Experiment | Voltage (*) | Qirr (%) | 3 C rate performance (%) | DQ7 (mAh/g) | DQ8 (mAh/g) | Capacity fading at 0.1 C (%) | Capacity fading at 1 C (%) | Energy density at 0.1 C (mWh/cm$^3$) |
|---|---|---|---|---|---|---|---|---|
| LCO-1 | 4.5-3.0 V | 4.3 | 88.4 | 184.1 | 173.7 | 21.0 | 26.3 | 2807 |
|  | 4.6-3.0 V |  |  | 202.1 | 181.2 | 130.9 | 164.2 | 3135 |

TABLE 7-continued electrochemical properties at 4.5 V and 4.6 V.

| Experiment | Voltage (*) | Qirr (%) | 3 C rate performance (%) | DQ7 (mAh/g) | DQ8 (mAh/g) | Capacity fading at 0.1 C (%) | Capacity fading at 1 C (%) | Energy density at 0.1 C (mWh/cm$^3$) |
|---|---|---|---|---|---|---|---|---|
| Ex1 | 4.5-3.0 V | 1.9 | 93.2 | 190.4 | 187.7 | 0.0 | 2.1 | 2900 |
|  | 4.6-3.0 V |  |  | 225.0 | 221.4 | 23.8 | 36.0 | 3485 |
| Ex2 | 4.5-3.0 V | 1.7 | 93.0 | 189.9 | 187.1 | 0.0 | 1.5 | 2893 |
|  | 4.6-3.0 V |  |  | 224.4 | 220.8 | 12.2 | 24.7 | 3476 |
| LCO-3 | 4.5-3.0 V | 3.5 | 87.7 | 184.5 | 171.9 | 25.9 | 36.6 | 2834 |
|  | 4.6-3.0 V |  |  | 194.2 | 174.7 | 115.2 | 162.2 | 3027 |
| Ex3 | 4.5-3.0 V | 2.5 | 91.6 | 189.7 | 184.1 | 0.4 | 2.0 | 3002 |
|  | 4.6-3.0 V |  |  | 219.7 | 213.9 | 3.2 | 8.9 | 3532 |
| LCO-4 | 4.5-3.0 V | 2.0 | 94.7 | 189.6 | 184.5 | 11.68 | 15.62 | 2645 |
|  | 4.6-3.0 V |  |  | 220.9 | 209.7 | 136.4 | 187.4 | 3134 |
| Ex4 | 4.5-3.0 V | 1.9 | 97.4 | 196.1 | 193.9 | 4.19 | 6.28 | 2724 |
|  | 4.6-3.0 V |  |  | 229.2 | 225.5 | 95.2 | 138.7 | 3239 |

(*) referring to the Table under Measurement techniques where either 4.5 or 4.6 V is used as cutoff in charge conditions Table 8 shows the discharge capacity, C-rate performances and average voltage at 4.4V of Ex4 and LCO-4. At 15 C, the C-rate and average voltage of Ex4 are improved when compared to LCO-4 resulting in an increase of the specific energy Es, defined as the product of the average discharge voltage and discharge capacity, by about 4%. Ex4, by featuring improved cycle life and specific energy is highly suitable for high power applications where maintaining high specific energy at high C-rate is required.

TABLE 8 discharge capacity, C-rate properties, average voltage <V> at 15 C and specific energy Es for LCO-4 and Ex4 at 4.4 V.

| Sample | DQ1 | 1 C (%) | 5 C (%) | 10 C (%) | 15 C (%) | 20 C (%) | <V> | Es mWh/g |
|---|---|---|---|---|---|---|---|---|
| LCO-4 | 172.9 | 97.3 | 94.6 | 93.2 | 91.9 | 90.1 | 3.76 | 597 |
| Ex4 | 173.1 | 99.0 | 96.8 | 95.2 | 94.0 | 92.8 | 3.81 | 620 |

The invention claimed is:

1. A lithium metal oxide powder for use as a cathode material in a rechargeable battery, comprising a core material and a surface layer,
   the core material comprising a layered crystal structure comprising the elements Li, a metal M and oxygen, wherein the Li content is stoichiometrically controlled, the metal M has the formula $M=Co_{1-a}M'_a$, with $0 \leq a \leq 0.05$, and M' is either one or more metals selected from the group consisting of Al, Ga and B; and
   the surface layer having a thickness of at least 50 nm and comprising a mixture of the elements of the core material, Li, M, and oxygen, and inorganic N-based oxides, wherein N is one or more metals selected from the group consisting of Mg, Ti, Fe, Cu, Ca, Ba, Y, Sn, Sb, Na, Zn, Zr and Si, and wherein the concentration in N metals decreases with increasing distance from the surface to the core on a gradient, and wherein the concentration of N metals in the core is not zero.

2. The lithium metal oxide powder of claim 1, wherein $0 < a \leq 0.03$.

3. The lithium metal oxide powder of claim 1, having a mean particle size D50 of at least 5 μm.

4. The lithium metal oxide powder of claim 1, wherein the thickness of the surface layer is less than 100 nm.

5. The lithium metal oxide powder of claim 1, wherein the surface layer further comprises less than 2000 ppm of one or more of LiF, $Li_3PO_4$ and $Li_2SO_4$.

6. The lithium metal oxide powder of claim 1, wherein the metal in the core material is diamagnetic.

7. The lithium metal oxide powder of claim 6, wherein in the core material, the Li occupies a crystallographic site surrounded by trivalent diamagnetic metals.

8. The lithium metal oxide powder of claim 1, having a pressed density of at least 3.40 g/cm$^3$.

9. The lithium metal oxide powder of claim 1, having a reversible electrode capacity of at least 200 mAh/g, when used as an active component in a cathode which is cycled between 3.0 and 4.6 V vs. Li$^+$/Li at a discharge rate of 0.1 C.

10. The lithium metal oxide powder of claim 9, having a capacity fade rate per 100 cycles at 1 C below 60%.

11. The lithium metal oxide powder of claim 1, wherein N comprises Mg and Ti, the Mg content being between 0.1 and 1 mol % and the Ti content being between 0.1 and 0.5 mol %.

12. The lithium metal oxide powder of claim 1, having a total base content of less than 50 μmol/g.

13. The lithium metal oxide powder of claim 1, having a carbon content less than 50 ppm.

14. The lithium metal oxide powder of claim 1, having an electrical conductivity less than $10^{-4}$ S/cm.

15. The lithium metal oxide powder of claim 1, wherein the surface layer is substantially free from lithium salts.

16. The lithium metal oxide powder of claim 1, comprising monolithic, potato-shaped and non-agglomerated particles.

17. The lithium metal oxide powder of claim 1, wherein the powder has a bimodal particle shape distribution where the small particle size fraction has a D50≤5 μm and is between 3 to 20 Vol %, and where the large particle size fraction has a D50≥12 μm.

18. The lithium metal oxide powder of claim 1, wherein the core material is substantially free from oxygen vacancies and from Li substitution for M in the $MO_2$ layers of the layered crystal structure.

19. The lithium metal oxide powder of claim 1, wherein the core material is substantially free from paramagnetic metals.

* * * * *